US012202566B2

(12) United States Patent
Momiyama et al.

(10) Patent No.: US 12,202,566 B2
(45) Date of Patent: Jan. 21, 2025

(54) STRADDLED VEHICLE

(71) Applicant: YAMAHA HATSUDOKI KABUSHIKI KAISHA, Iwata (JP)

(72) Inventors: Yoshitaka Momiyama, Shizuoka (JP); Hayatoshi Sato, Shizuoka (JP); Masaki Torigoshi, Shizuoka (JP); Makoto Kuroiwa, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 605 days.

(21) Appl. No.: 17/507,663

(22) Filed: Oct. 21, 2021

(65) Prior Publication Data

US 2022/0041245 A1 Feb. 10, 2022

Related U.S. Application Data

(63) Continuation-in-part of application No. PCT/JP2020/005984, filed on Feb. 17, 2020.

(30) Foreign Application Priority Data

Apr. 24, 2019 (JP) ................. 2019-083224

(51) Int. Cl.
B62K 11/04 (2006.01)
(52) U.S. Cl.
CPC .................... B62K 11/04 (2013.01)
(58) Field of Classification Search
CPC .................................................... B62K 11/04
See application file for complete search history.

(56) References Cited

U.S. PATENT DOCUMENTS

| 3,948,052 | A | 4/1976 | Merkle et al. |
| 9,284,927 | B2 * | 3/2016 | Inayama .......... F02M 35/10157 |
| 11,904,971 | B2 * | 2/2024 | Makita ..................... B62M 7/02 |
| 2015/0101875 | A1 | 4/2015 | Inayama et al. |
| 2019/0120130 | A1 | 4/2019 | Kuroiwa et al. |
| 2022/0041240 | A1 * | 2/2022 | Makita ..................... F01P 11/10 |

FOREIGN PATENT DOCUMENTS

| DE | 102018005067 A1 * | 1/2019 | ............. B62M 7/02 |
| EP | 0038201 A2 | 10/1981 | |
| EP | 3456619 A1 * | 3/2019 | ............. B62M 7/02 |
| JP | S49-75913 A | 7/1974 | |

(Continued)

*Primary Examiner* — Kevin Hurley
(74) *Attorney, Agent, or Firm* — Rabin & Berdo, P.C.

(57) ABSTRACT

A straddled vehicle including a vehicle body frame, an engine unit, and at least one front wheel. The engine unit includes a turbocharger, and an engine body including a cylinder head and a cylinder head cover. The cylinder head cover is fixed to a first surface of the cylinder head. The turbocharger is fixed to a second surface of the cylinder head, a surface of the turbocharger through which the turbocharger is fixed to the cylinder head being a third surface. When the vehicle body frame is in an upright state, a turbocharger rotation axis, the second and third surfaces are positioned above a first horizontal plane in which the front axle lies, above a second horizontal plane in which the crankshaft axis lies, and below a third horizontal plane in which a front end of the first surface lies, in the upward-downward direction of the straddled vehicle.

8 Claims, 7 Drawing Sheets

(56) References Cited

FOREIGN PATENT DOCUMENTS

| | | |
|---|---|---|
| JP | S60-45817 U | 3/1985 |
| JP | S60-240523 A | 11/1985 |
| JP | H02-201026 A | 8/1990 |
| JP | H08-284602 A | 10/1996 |
| JP | H11-257083 A | 9/1999 |
| JP | 2010-281282 A | 12/2010 |
| JP | 2012-241619 A | 12/2012 |
| JP | 2017-186929 A | 10/2017 |
| JP | 2018-053839 A | 4/2018 |
| WO | 2016/098906 A1 | 6/2016 |
| WO | 2017/217449 A1 | 12/2017 |

\* cited by examiner

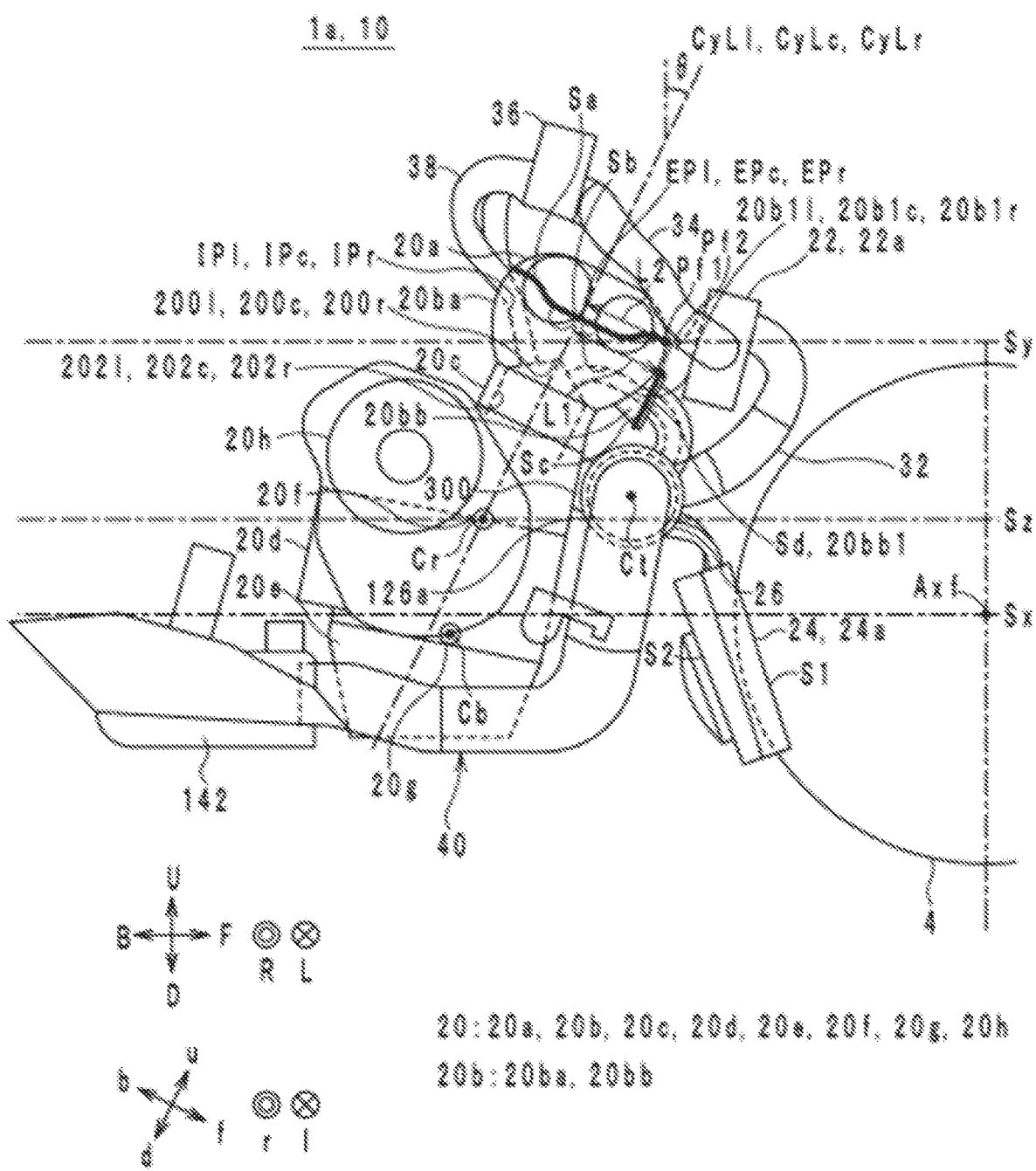

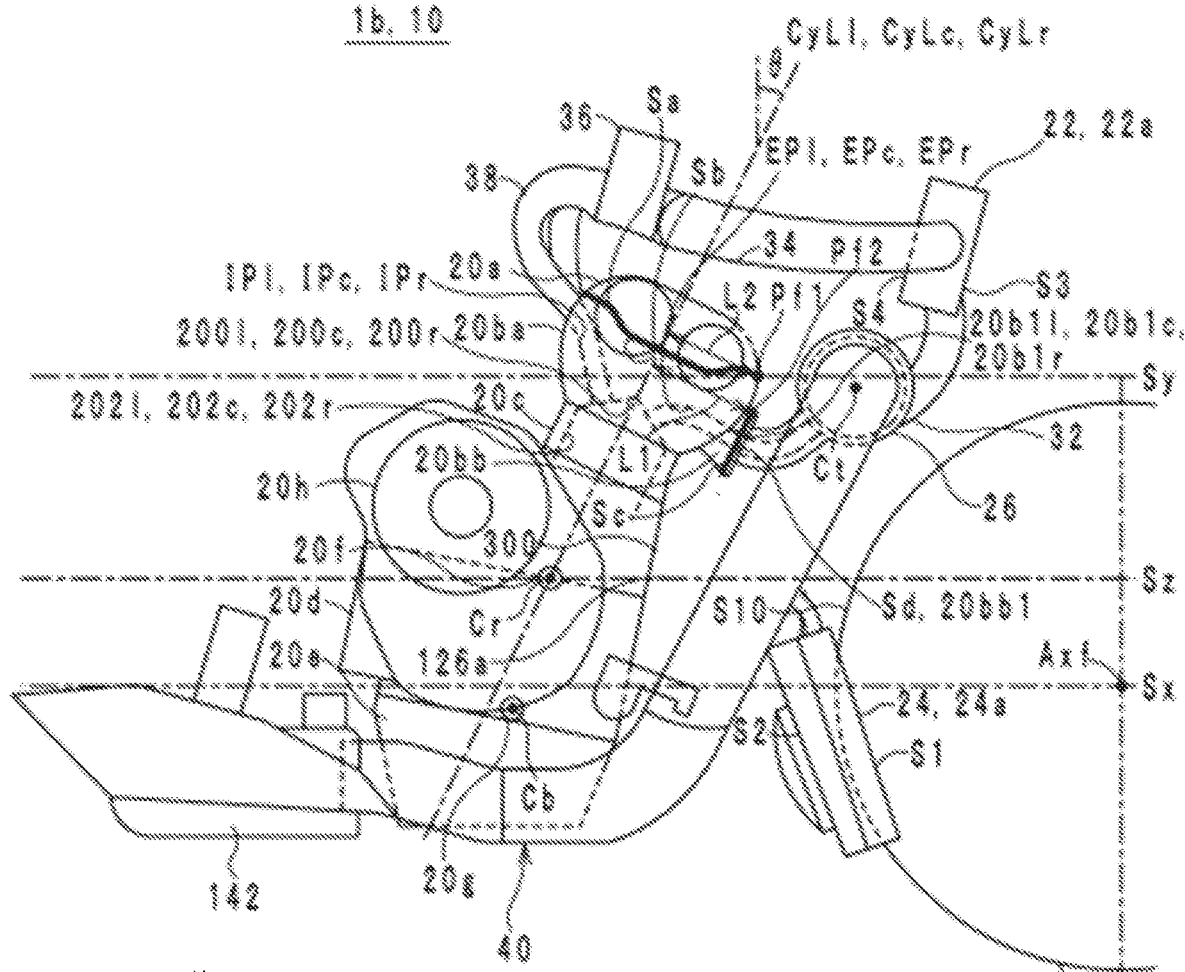

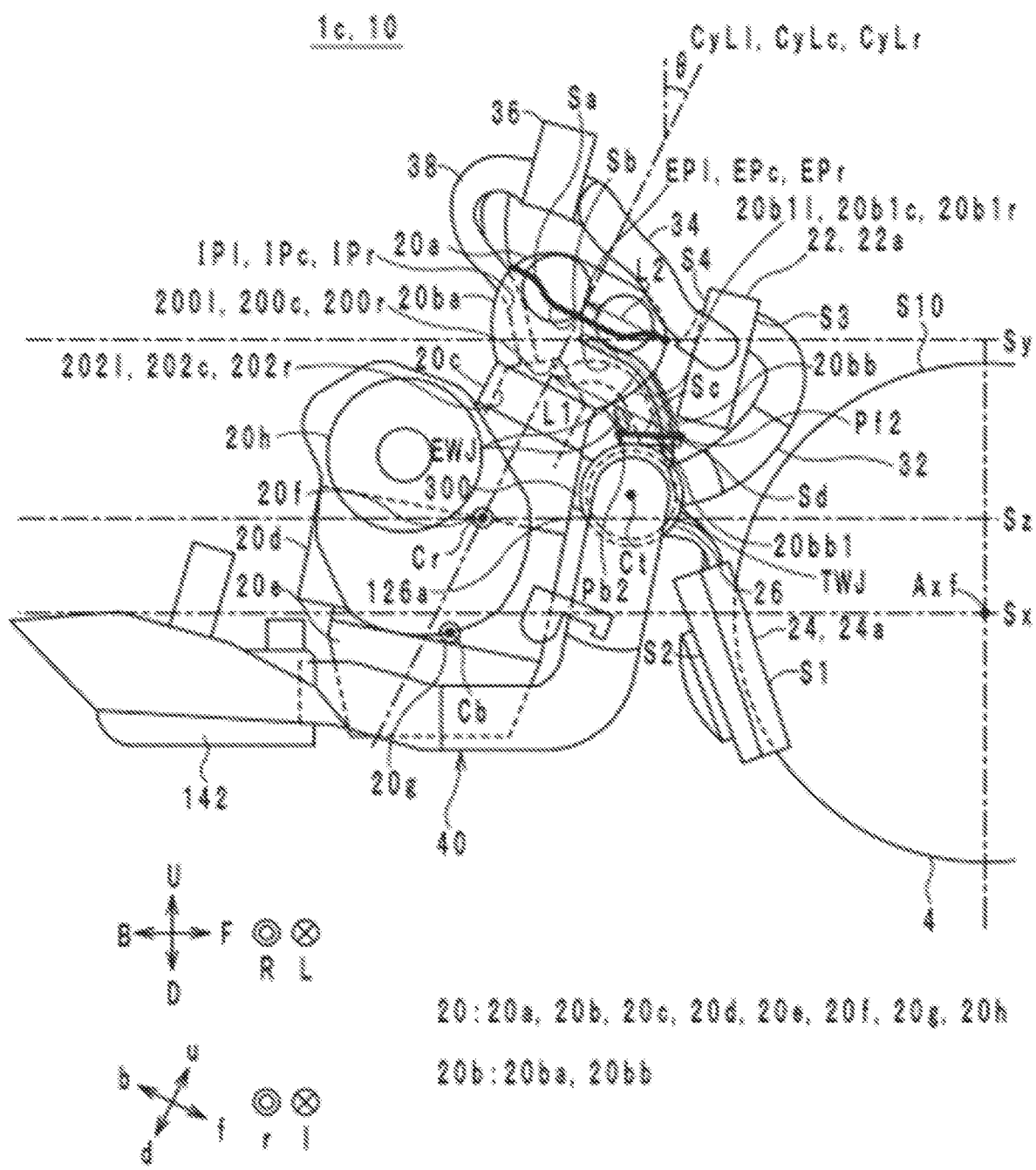

STRADDLED VEHICLE

CROSS-REFERENCE TO RELATED APPLICATIONS

This is a continuation-in-part application of International Application PCT/JP2020/005984 filed on Feb. 17, 2020, which claims priority from a Japanese Patent Application No. 2019-083224, filed on Apr. 24, 2019. The contents of the applications are incorporated herein by reference.

TECHNICAL FIELD

The present teaching relates to a straddled vehicle with a turbocharger.

BACKGROUND ART

As an example of conventional straddled vehicles, a straddled vehicle as disclosed in Patent Literature 1 is known. The straddled vehicle disclosed in Patent Literature 1 has a turbocharger. When the straddled vehicle is viewed from a leftward or rightward position, the turbocharger is positioned more backward than the front wheel and more frontward than the engine body. Patent Document 1 intends to prevent such a straddled vehicle from increasing in size with the inclusion of a turbocharger.

CITATION LIST

Patent Literature

Patent Literature 1: International Patent Application Publication No. WO 2016/098906

SUMMARY OF INVENTION

Technical Problem

Regarding the straddled vehicle disclosed in Patent Literature 1, a shortened the wheelbase, which is the distance between the front axle and the rear axle, is demanded.

Therefore, an object of the present teaching is to provide a straddled vehicle that has a shortened wheelbase while still including a turbocharger.

Solution to Problem

The present teaching provides a structure below in order to solve the problem.

A straddled vehicle of (1) is a straddled vehicle including:
a vehicle body frame;
an engine unit supported by the vehicle body frame; and
at least one front wheel that is positioned more frontward than the engine unit when viewed from a leftward or rightward position and is rotatable around a front axle;
wherein:
the engine unit includes:
  an engine body including a crank case, a cylinder block, a cylinder head, a cylinder head cover, and a crankshaft;
  a turbocharger including a turbine wheel that is rotatable around a turbocharger rotation axis by exhaust air flowing out of the engine body, and a compressor wheel that is rotatable around the turbocharger rotation axis by the rotation of the turbine wheel and compresses the intake air;
the crankshaft is rotatable around a crankshaft axis;
the crank case supports the crankshaft;
the cylinder block is fixed to the crank case and includes a plurality of cylinder bores arranged side-by-side in a line, each of the cylinder bores having a cylinder axis extending in an upward-downward direction;
the cylinder head is fixed to the cylinder block and includes: a plurality of combustion chambers; at least one cylinder-head exhaust outlet; and at least one exhaust passage, the number of the plurality of combustion chambers equaling the number of cylinder bores and arranged in a line, the number of the at least one cylinder-head exhaust outlet being smaller than the number of the combustion chambers and allowing the exhaust air to flow therethrough out of the cylinder head, the number of the at least one exhaust passage being smaller than the number of the combustion chambers and connecting the plurality of combustion chambers to the at least one cylinder-head exhaust outlet,
the cylinder head cover is fixed to a surface of the cylinder head;
the turbocharger is positioned more frontward than the engine body and more backward than the at least one front wheel when viewed from a leftward or rightward position;
when seen in a backward direction, the turbocharger is at least partly within the area of the engine body;
the turbocharger is fixed to a surface of the cylinder head so as to receive the exhaust air flowing out through the at least one cylinder-head exhaust outlet, of which the number is smaller than the number of the combustion chambers;
the surface of the turbocharger to which the cylinder head is fixed is defined as cylinder-head-fixed surface;
the surface of the cylinder head to which the turbocharger is fixed is defined as turbocharger-fixed surface;
the surface of the cylinder head to which the cylinder head cover is fixed is defined as cylinder-head-cover-fixed surface;
when the vehicle body frame is in an upright state, the turbocharger rotation axis, the turbocharger-fixed surface and the cylinder-head-fixed surface are positioned above a front-axle horizontal plane, in which the front axle exists, and a crankshaft-axis horizontal plane, in which the crankshaft axis exists, and below a cylinder-head-cover-fixed-surface-front-end horizontal plane, in which a front end of the cylinder-head-cover-fixed surface exists, when viewed from a leftward or rightward position; and
when viewed from a leftward or rightward position, the distance is longer than the distance, the distance being defined as a distance between a front end of the turbocharger-fixed surface and the cylinder axis, the distance being defined as a distance between the front end of the cylinder-head-cover-fixed surface and the cylinder axis, the turbocharger-fixed surface being positioned more upward than the front-axle horizontal plane and the crankshaft horizontal plane and more downward than the cylinder-head-cover-fixed-surface-front-end horizontal plane.

Even though the straddled vehicle of (1) contains a turbocharger, the wheelbase can be shortened. Specifically, in the straddled vehicle of (1), the cylinder head includes: at least one cylinder-head exhaust outlet; and at least one exhaust passage, the at least one cylinder-head exhaust outlet being smaller than the number of the combustion chambers and allowing the exhaust air to flow therethrough out of the cylinder head, the at least one exhaust passage being smaller than the number of the combustion chambers and connecting the plurality of combustion chambers to the at least one cylinder-head exhaust outlet. Thus, the cylinder head includes an exhaust manifold that joins a plurality of exhaust passages into one exhaust passage. The turbocharger is fixed to the cylinder head in such a manner that the exhaust air flows from the cylinder-head exhaust outlet, of which number is smaller than the number of the combustion chambers, into the turbocharger. Therefore, the turbocharger is fixed to the exhaust manifold. The exhaust manifold is positioned in the front part of the engine body, and the turbocharger is positioned so as to protrude forward from the engine body. Accordingly, the distance between the front end of the turbocharger-fixed surface, which is positioned above the front-axle horizontal plane and the crankshaft horizontal plane and below the cylinder-head-cover-fixed-surface-front-end horizontal plane when viewed from a leftward or rightward position, and the cylinder axis is longer than the distance between the front end of the cylinder-head-cover-fixed surface and the cylinder axis. In such a straddled vehicle, the at least one front wheel is positioned away from the engine body so as not to interfere with the turbocharger, and the wheelbase is likely to be long.

In the area above the front-axle horizontal plane, the outside edge of the front wheel is curved forward. Accordingly, due to the curvature of the front wheel, the distance between the outside edge of the front wheel and the engine body gradually increases in a more upward part from the front-axle horizontal plane. Accordingly, it is easier to arrange the members in a space above the front-axle horizontal plane and more frontward than the engine body than to arrange the members in a space across the front-axle horizontal plane and more frontward than the engine body.

The engine body is likely to have a greater dimension in the forward-backward direction on the crankshaft-axis horizontal plane than the dimension in the forward-backward direction on a level above the crankshaft-axis horizontal plane. Therefore, it is also easier to arrange the members in a space above the crankshaft-axis horizontal plane and more frontward than the engine body than to arrange the members in a space across the crankshaft-axis horizontal plane more frontward than the engine body.

The dimension of the engine body in the forward-backward direction on the cylinder-head-cover-fixed-surface-front-end horizontal plane is likely to be greater than the dimension of the engine body in the forward-backward direction on a plane below the cylinder-head-cover-fixed-surface-front-end horizontal plane. Accordingly, it is easier to arrange the members in a space below the cylinder-head-cover-fixed-surface-front-end horizontal plane and more frontward than the engine body than to arrange the members across the cylinder-head-cover-fixed-surface-front-end horizontal plane in a space more frontward than the engine body.

Therefore, in the straddled vehicle of (1), when viewed from a leftward or rightward position and when the vehicle body frame is in an upright state, the turbocharger rotation axis, the turbocharger-fixed surface and the cylinder-head-fixed surface are positioned above the front-axle horizontal plane in which the front axle exists and the crankshaft-axis horizontal plane in which the crankshaft axis exists and below the cylinder-head-cover-fixed-surface-front-end horizontal plane in which the front end of the cylinder-head-cover-fixed surface exists. Thus, in the straddled vehicle of (1), when viewed from a leftward or rightward position, the turbocharger is placed more frontward than the engine body and more backward than at least one front wheel and in a space that permits easy arrangement of members. This gives some room around the turbocharger, and it becomes possible to place the engine body and at least one front wheel closer to each other. Therefore, even though the straddled vehicle of (1) contains a turbocharger, it is possible to shorten the wheelbase.

A straddled vehicle of (2) is the straddled vehicle of (1), wherein the cylinder axis is inclined forward from the upward-downward direction; and the exhaust air flows downward from the cylinder-head exhaust outlet.

According to the straddled vehicle of (2), even though a turbocharger is contained, the wheelbase of the straddled vehicle can be shortened. Specifically, since the cylinder axis is inclined forward from the upward-downward direction, the engine body is tilted forward. In this case, it is easy to arrange some members in a space more frontward and more downward than the engine body. Therefore, in the straddled vehicle of (2), the turbocharger is positioned in the space more frontward and more downward than the engine body. Specifically, the exhaust air flows downward from the cylinder-head exhaust outlet. Accordingly, the turbocharger is positioned in a space more downward than the cylinder-head exhaust outlet. The space more downward than the cylinder-head exhaust outlet is in the space more frontward and more downward than the engine body. Therefore, the turbocharger is positioned in the space more frontward and more downward than the engine body, which is a space that permits easy arrangement of some members. This gives more space around the turbocharger, and it becomes possible to place the engine body and the front wheel closer to each other. Therefore, the straddled vehicle of (2), even though a turbocharger is contained, it is possible to shorten the wheelbase.

A straddled vehicle of (3) is the straddled vehicle of (1), wherein:
 the cylinder axis is inclined forward from the upward-downward direction; and
 the turbocharger-fixed surface and the cylinder-head-fixed surface are parallel to the cylinder axis.

A straddled vehicle of (4) is the straddled vehicle of any one of (1) to (3), wherein the turbocharger rotation axis is below both the turbocharger-fixed surface and the cylinder-head-cover-fixed surface.

A straddled vehicle of (5) is the straddled vehicle of (2), wherein:
 the turbocharger rotation axis extends in a leftward-rightward direction; and
 when seen in a leftward direction, the exhaust air flows clockwise within the turbocharger.

According to the straddled vehicle of (5), even though a turbocharger is contained, it is possible to shorten the wheelbase. Specifically, the exhaust air flows downward from the cylinder-head exhaust outlet. When seen in a leftward direction, the exhaust air flows clockwise in the turbocharger. In the case that these two conditions are satisfied, the exhaust air flows into the turbocharger through the front and upper part of the turbocharger. Accordingly, the turbocharger-fixed surface and the cylinder-head-fixed surface are positioned more upward than the front part of the turbocharger. In this case, only a small part of the turbocharger protrudes forward from the turbocharger-fixed surface and the cylinder-head-fixed surface. Thus, the turbocharger is positioned near the engine body. Thereby, the engine body and the front wheel can be positioned closer to each other. As a result, even though the straddled vehicle of (5) contains a turbocharger, it is possible to shorten the wheelbase.

A straddled vehicle of (6) is the straddled vehicle of any one of (1) to (3), wherein the turbocharger rotation axis is above both the turbocharger-fixed surface and the cylinder-head-cover-fixed surface.

A straddled vehicle of (7) is the straddled vehicle of (6), wherein:
  the turbocharger rotation axis extends in a leftward-rightward direction; and
  when seen in a leftward direction, the exhaust air flows counterclockwise within the turbocharger.

A straddled vehicle of (8) is the straddled vehicle of any one of (1) to (7), wherein:
  a direction perpendicular to the cylinder axis when viewed from a leftward or rightward position is defined as a cylinder-axis-forward-backward direction;
  an engine water jacket that is formed in the cylinder head is entirely positioned more frontward along the cylinder-axis-forward-backward direction than the front end of the cylinder-head-cover-fixed surface; and
  the engine water jacket is a passage in which a cooling water that cools the engine body flows.

In the straddled vehicle of (8), the cylinder head can be cooled efficiently. Specifically, in the cylinder head, the exhaust manifold may occupy the space that is entirely more frontward along the cylinder-axis-forward-backward direction than the front end of the cylinder-head-cover-fixed surface. High-temperature exhaust air flows through the exhaust manifold. Therefore, it is preferred to cool the exhaust manifold. For this purpose, the exhaust manifold is covered with the engine water jacket. Accordingly, in the straddled vehicle of (8), the cylinder head can be cooled efficiently.

A straddled vehicle of (9) is the straddled vehicle of (8), wherein:
  a turbocharger water jacket is formed in the turbocharger; and
  the engine water jacket and the turbocharger water jacket are connected to each other.

In the straddled vehicle of of (9), since the turbocharger water jacket is connected to the engine water jacket, the turbocharger is cooled. Therefore, the turbocharger is required to have only a small heat capacity, and the turbocharger can be reduced in size. Accordingly, it is possible to place the engine body and the front wheel closer to each other. As a result, even though the straddled vehicle of (9) contains a turbocharger, it is possible to shorten the wheelbase.

A straddled vehicle of (10) is the straddled vehicle of any one of (1) to (9), wherein:
  when viewed from a leftward or rightward position, the front end of the turbocharger-fixed surface is entirely positioned more frontward than the turbocharger rotation axis; and
  when viewed from a leftward or rightward position, a rear end of the turbocharger-fixed surface is entirely positioned more backward than the turbocharger rotation axis.

Even though the straddled vehicle of (10) contains a turbocharger, it is possible to shorten the wheelbase. Specifically, when viewed from a leftward or rightward position, the front end of the turbocharger-fixed surface is entirely positioned more frontward than the turbocharger rotation axis. Also, when viewed from a leftward or rightward position, the rear end of the turbocharger-fixed surface is entirely positioned more backward than the turbocharger rotation axis. Accordingly, when viewed from an upward or downward position, the turbocharger rotation axis crosses the turbocharger-fixed surface. In other words, the turbocharger rotation axis is near the turbocharger-fixed surface, and the exhaust passage from the turbocharger-fixed surface to the turbocharger rotation axis is shortened. Because of the short exhaust passage, there is extra space in the area that is more backward than the front wheel and more frontward than the engine body. Therefore, it is possible to place the engine body and the front wheel closer to each other. As a result, even though the straddled vehicle of (10) contains a turbocharger, the wheelbase can be shortened.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meanings as commonly understood by one of ordinary skill in the art to which the present teaching pertains.

It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Advantageous Effect of Invention

The present teaching permits a straddled vehicle with a turbocharger to have a short wheelbase.

BRIEF DESCRIPTION OF DRAWINGS

FIG. 5 is a right side view of the engine unit 10 of a straddled vehicle 1a.

FIG. 6 is a right side view of the engine unit 10 of a straddled vehicle 1b.

FIG. 7 is a right side view of the engine unit 10 of a straddled vehicle 1c.

DESCRIPTION OF EMBODIMENTS

Embodiment

[Structure of Straddled Vehicle]

Figure 1:
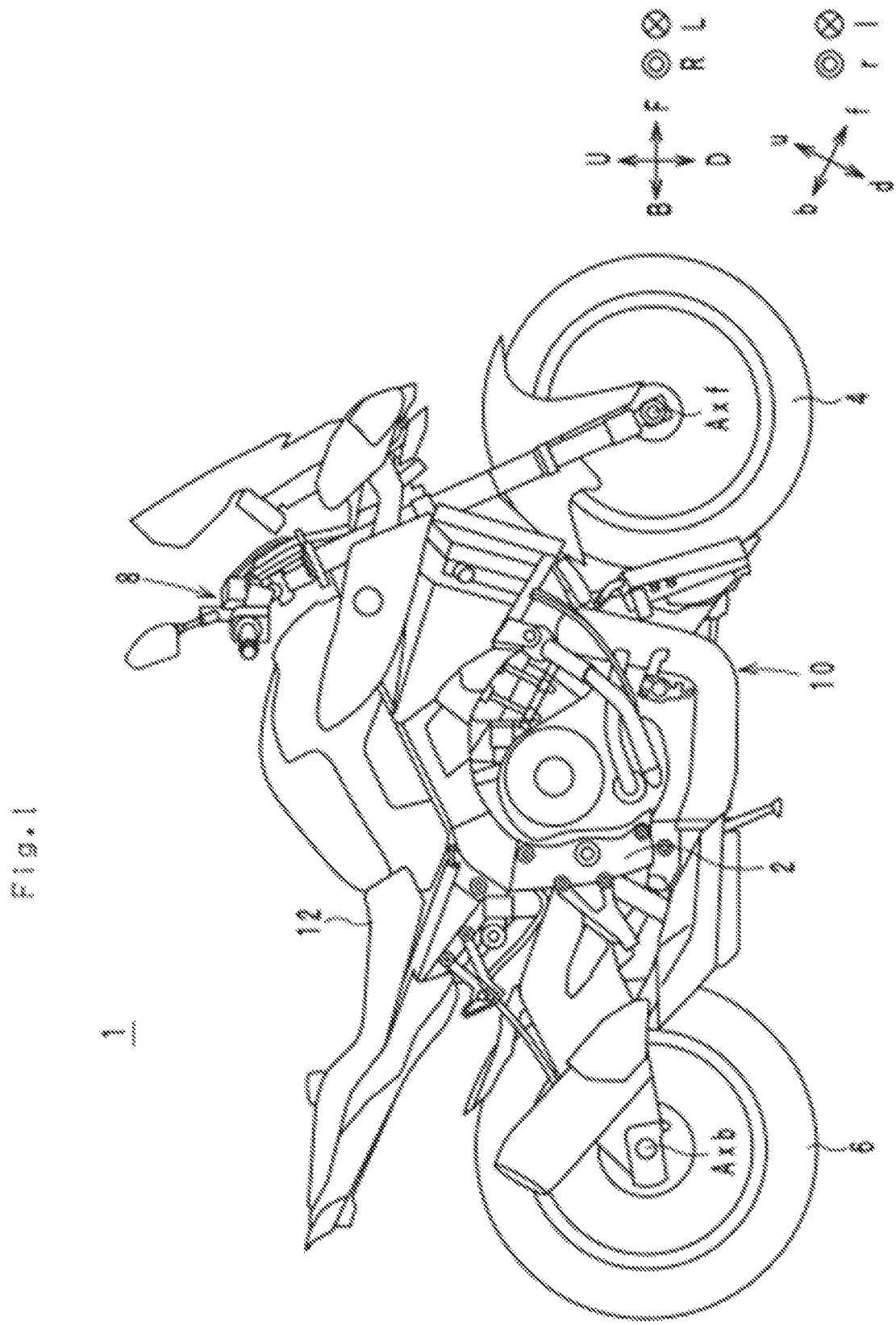
FIG. 1 is a right side view of a straddled vehicle 1.

A straddled vehicle according to an embodiment of the present teaching will hereinafter be described with reference to the drawings. FIG. 1 is a right side view of the straddled vehicle 1.

In the following paragraphs, forward, frontward or the front of the straddled vehicle 1 is referred to simply as forward, frontward or the front F. Backward, rearward or the back of the straddled vehicle 1 is referred to simply as backward, rearward or the back B. Leftward or the left of the straddled vehicle 1 is referred to simply as leftward or the left L. Rightward or the right of the straddled vehicle 1 is referred to simply as rightward or the right R. Upward or above the straddled vehicle 1 is referred to simply as upward or above U. Downward or below the straddled vehicle 1 is referred to simply as downward or below D. The forward-backward direction relative to the straddled vehicle 1 is defined as Front-Back Direction FB. The leftward-rightward direction relative to the straddled vehicle 1 is defined as Left-Right Direction LR. The upward-downward direction relative to the straddled vehicle 1 is defined as Up-Down Direction UD. Forward, frontward or the front of the straddled vehicle 1 is forward, frontward or the front from the perspective of a rider riding the straddled vehicle 1. Backward, rearward or the back of the straddled vehicle 1 is backward, rearward or the back from the perspective of a rider riding the straddled vehicle 1. Leftward or the left of straddled vehicle 1 is leftward or the left from the perspective of a rider riding the straddled vehicle 1. Rightward or the right of the straddled vehicle 1 is rightward or the right from the perspective of a rider riding the straddled vehicle 1. Upward or above the straddled vehicle 1 is upward or above from the perspective of a rider riding the straddled vehicle 1. Downward or below the straddled vehicle 1 is downward or below from the perspective of a rider riding the straddled vehicle 1.

In this specification, a shaft or a member that extends in the forward-backward direction does not necessarily mean a shaft or a member that extends parallel to the forward-backward direction. A shaft or a member that extends in the forward-backward direction may include a shaft or a member that is inclined from the forward-backward direction in the leftward or rightward direction or the upward or downward direction at an angle within ±45 degrees. In a similar way, a shaft or a member that extends in the upward-downward direction may include a shaft or a member that is inclined from the upward-downward direction in the forward or backward direction or the leftward or rightward direction at an angle within ±45 degrees. A shaft or a member that extends in the leftward-rightward direction may include a shaft or a member that is inclined from the leftward-rightward direction in the forward or backward direction or the upward or downward direction at an angle within ±45 degrees. A state in which nobody is riding the straddled vehicle 1, the straddled vehicle 1 is loaded with no fuel, and the front wheel is neither steered nor caused to lean is referred to as an upright state of the vehicle body frame 2.

In this specification, the term "downward" does not necessarily mean a vector that is exactly downward. The term "downward" includes vectors inclined from the exactly downward direction within an angle range of ±45 degrees. The same applies to the other terms indicating directions as well as the forward-backward direction.

When two arbitrary members described in the present specification are defined as a first member and a second member, respectively, the relationship between these two members is as follows. In the present specification, a statement that the first member is supported by the second member includes a case in which the first member is attached to the second member in such a manner that the first member is immovable (that is, fixed in a place) relative to the second member and a case in which the first member is attached to the second member in such a manner that the first member is movable relative to the second member. The statement that the first member is supported by the second member also includes a case in which the first member is directly attached to the second member and a case in which the first member is attached to the second member via a third member.

In the present specification, a statement that refers to the first member and the second member being arranged in the forward-backward direction means that when the first member and the second member are viewed from a position perpendicular to the forward-backward direction (from an upward or downward position or from a leftward or a rightward position), both the first member and the second member are on an arbitrary line extending in the forward-backward direction. In the present specification, a statement that the first member and the second member are arranged in the forward-backward direction when viewed from an upward or downward position means the following: when the first member and the second member are viewed from an upward or downward position, both the first member and the second member are on an arbitrary line extending in the forward-backward direction. In this case, when the first member and the second member are viewed from a leftward or rightward position, which is different from the upward or downward position, the first member and the second member are not necessarily on the same arbitrary line extending in the forward-backward direction. Further, the first member and the second member may be in contact with each other or may be out of contact with each other. A third member may be positioned between the first member and the second member. Such definitions discussed above apply to other directions as well as the forward-backward direction.

In the present specification, a statement that the first member is positioned more frontward than the second member means the following: at least part of the first member is positioned within the area of the range of movement of the second member during a translation of the second member in the forward direction. Accordingly, the first member may be positioned entirely within the area that the second member passes during a translation in the forward direction, or part of the first member may protrude from the area that the second member passes during a translation in the forward direction. In this case, the first member and the second member are arranged in the forward-backward direction. This definition applies to other directions as well as the forward-backward direction.

In the present specification, a statement that the first member is entirely positioned more frontward than the second member means the following: the entire first member is positioned more frontward than the plane in which the front end of the second member exists and is perpendicular to the forward-backward direction. The first member and the second member may or may not be arranged exactly in the forward-backward direction. This definition applies to other directions as well as the forward-backward direction.

In the present specification, a statement that the first member is positioned more frontward than the second member when viewed from the leftward-rightward direction means the following: when the first member and the second member are viewed from a leftward or rightward position, at least part of the first member is positioned within the area of the range of movement of the second member during a translation of the second member in the forward direction. According to this definition, three-dimensionally, the first member and the second member are not necessarily arranged strictly in line within the forward-backward direction. This definition applies to other directions as well as the forward-backward direction.

In the present specification, unless otherwise noted, parts of the first member are defined as follows. The front part of the first member means the front half of the first member. The rear part of the first member means the rear half of the first member. The left part of the first member means the left half of the first member. The right part of the first member means the right half of the first member. The upper part of the first member means the upper half of the first member. The lower part of the first member means the lower half of the first member. The upper end of the first member means the end of the first member in the upward direction. The lower end of the first member means the end of the first member in the downward direction. The front end of the first member means the end of the first member in the forward direction. The rear end of the first member means the end of the first member in the backward direction. The left end of the first member means the end of the first member in the leftward direction. The right end of the first member means the end of the first member in the rightward direction. The upper end part of the first member means the upper end and the area around the upper end of the first member. The lower end part of the first member means the lower end and the area around the lower end of the first member. The front end part of the first member means the front end and the area around the front end of the first member. The rear end part of the first member means the rear end and the area around of the first member. The left end part of the first member means the left end and the area around the left end of the first member. The right end part of the first member means the right end and the area around the right end of the first member. The first member is a component of the straddled vehicle 1.

In the present specification, a statement that a structure (member, space or hole) is formed (positioned or provided) between a first member and a second member means that the structure exists between the first member and the second member with respect to the direction in which the first member and the second member are arranged. The structure may or may not protrude in a direction perpendicular to the direction in which the first member and the second member are arranged.

As shown in FIG. 1, the straddled vehicle 1 is, for example, a motorcycle. The straddled vehicle 1 includes a vehicle body frame 2, a front wheel 4, a rear wheel 6, a steering mechanism 8, an engine unit 10, and a seat 12. The vehicle body frame 2 leans leftward L when the straddled vehicle 1 turns to the left L. The vehicle body frame 2 leans rightward R when the straddled vehicle 1 turns to the right R. The vehicle body frame 2 is, for example, a cradle frame, a diamond frame, a truss frame, a twin-spar frame, a monocoque frame, or the like.

The seat 12 is positioned more upward U than the vehicle body frame 2. The seat 12 is supported by the vehicle body frame 2. The rider straddles and sits on the seat 12. Such a vehicle with a seat 12 to be straddled and sat on by a rider is referred to as a straddled vehicle.

The steering mechanism 8 is supported by the front part of the vehicle body frame 2. The steering mechanism 8 steers the front wheel 4 according to the rider's operation. The steering mechanism 8 includes a handlebar, a steering shaft, and a front folk. The handlebar, the steering shaft and the front folk each have a conventional structure, and any detailed descriptions of these parts are not herein provided.

The front wheel 4 is the steerable wheel of the straddled vehicle 1. The front wheel 4 is in the front part of the straddled vehicle 1. The front wheel 4 is supported by the vehicle body frame 2 via the steering mechanism 8. The rider can steer the front wheel 4 by manipulating the handlebar of the steering mechanism 8. The front wheel 4 is rotatable on a front axle Axf.

The rear wheel 6 is the drive wheel of the straddled vehicle 1. The rear wheel 6 is in the rear part of the straddled vehicle 1. The rear wheel 6 is supported by the vehicle body frame 2 via a swing arm. The rear wheel 6 is rotated on a rear axle Axb by the drive force generated by the engine unit 10.

The engine unit 10 is supported by the vehicle body frame 2. The engine unit 10, when viewed from a leftward (L) or a rightward (R) position, is positioned more backward B than the front wheel 4 and more frontward F than the rear wheel 6. Thus, when viewed from a leftward or rightward position, the front wheel 4 is positioned more frontward F than the engine unit 10. The rear wheel 6, when viewed from a leftward (L) or rightward (R) position, is positioned more backward B than the engine unit 10. In the present embodiment, the engine unit 10 is positioned more backward B than the front wheel 4 and more frontward F than the rear wheel 6. The front wheel 4 is positioned more frontward F than the engine unit 10. Thus, the rear wheel 6 is positioned more backward B than the engine unit 10. The engine unit 10 generates a drive force that rotates the rear wheel 6. The drive force generated by the engine unit 10 is transmitted to the rear wheel 6, and the rear wheel 6 is rotated by the drive force generated by the engine unit 10.

[Structure of Engine Unit]

Figure 2:
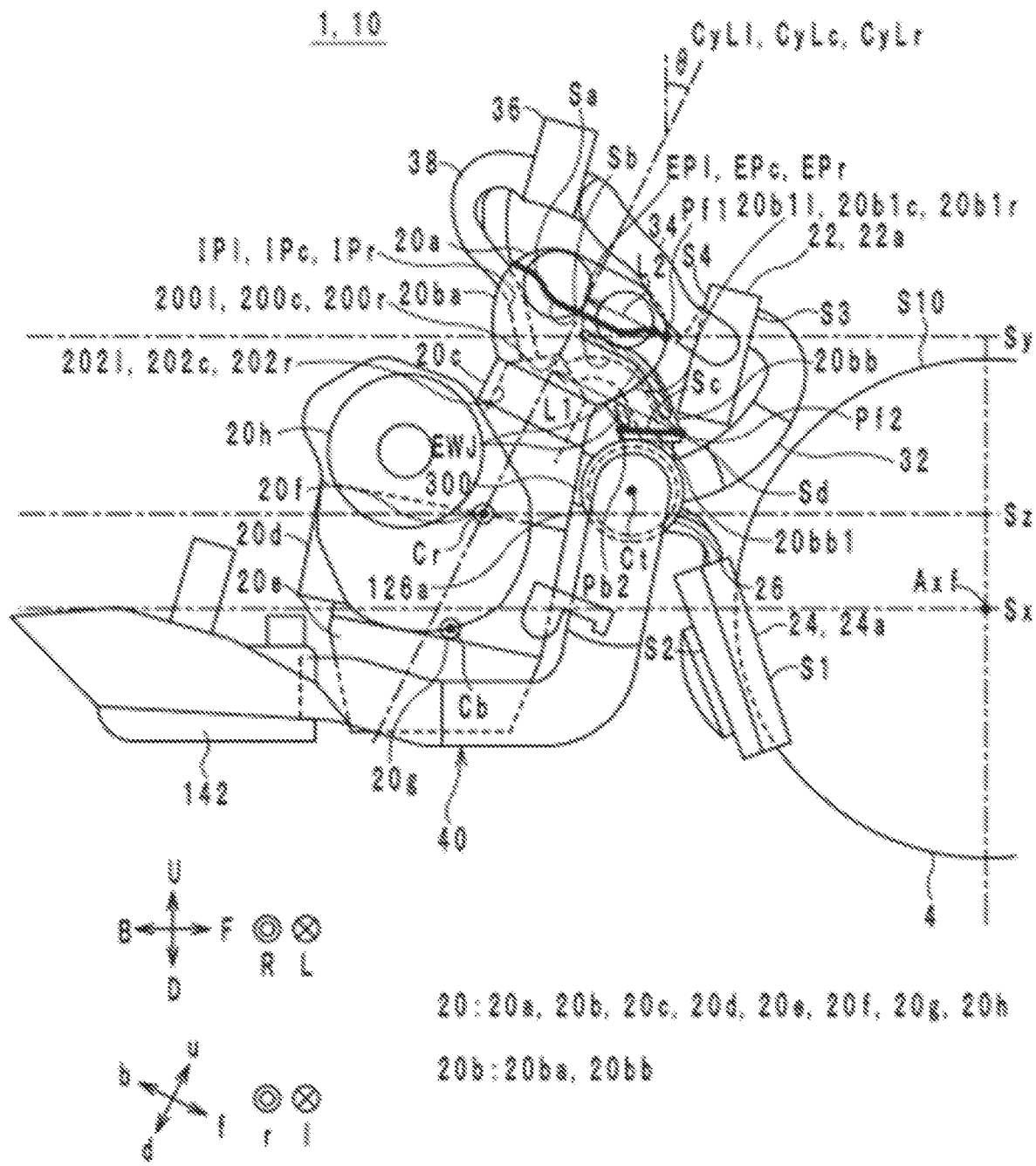
FIG. 2 is a right side view of the engine unit 10 of the straddled vehicle 1.
Figure 3:
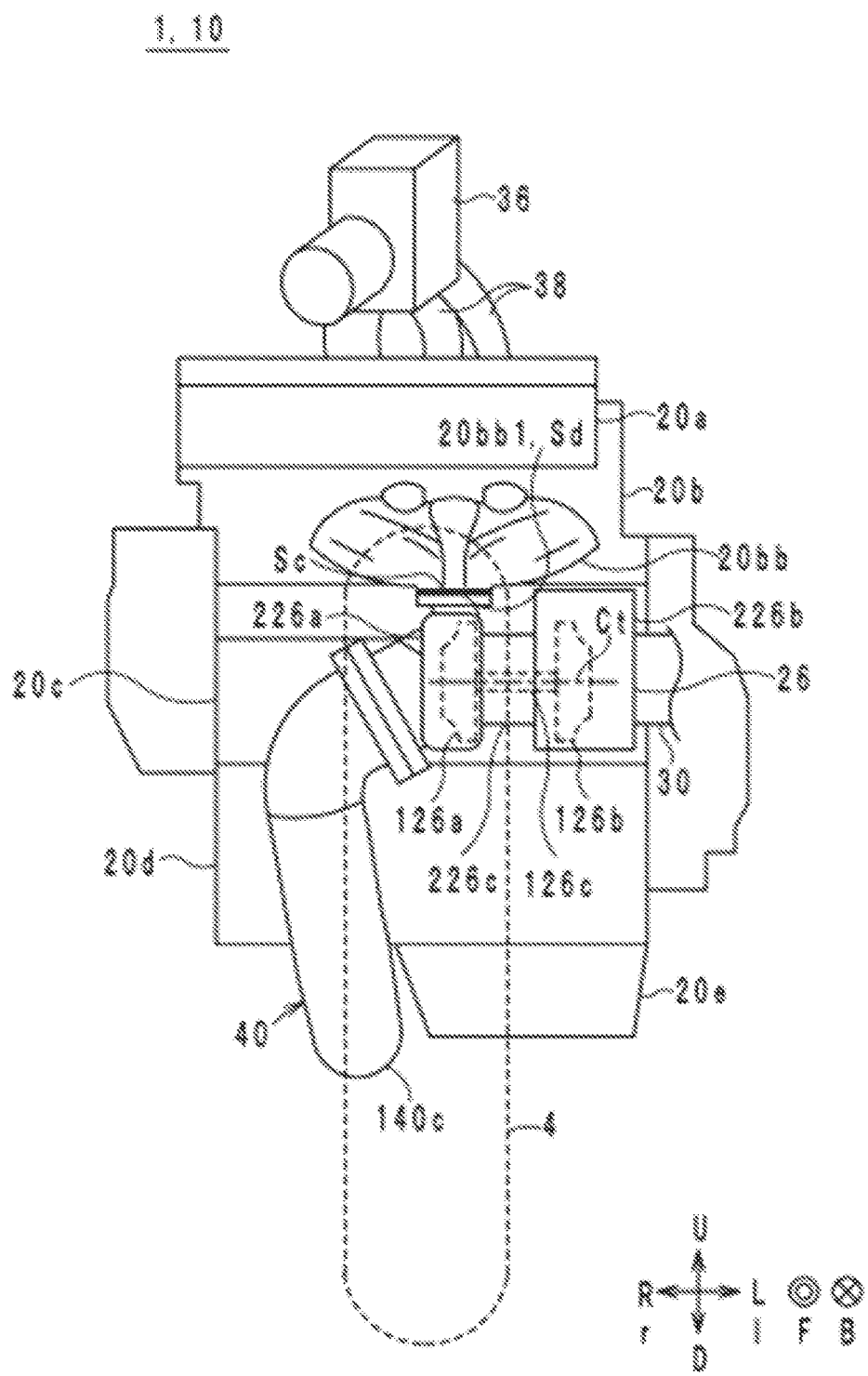
FIG. 3 is a front view of the engine unit 10 of the straddled vehicle 1.
Figure 4:
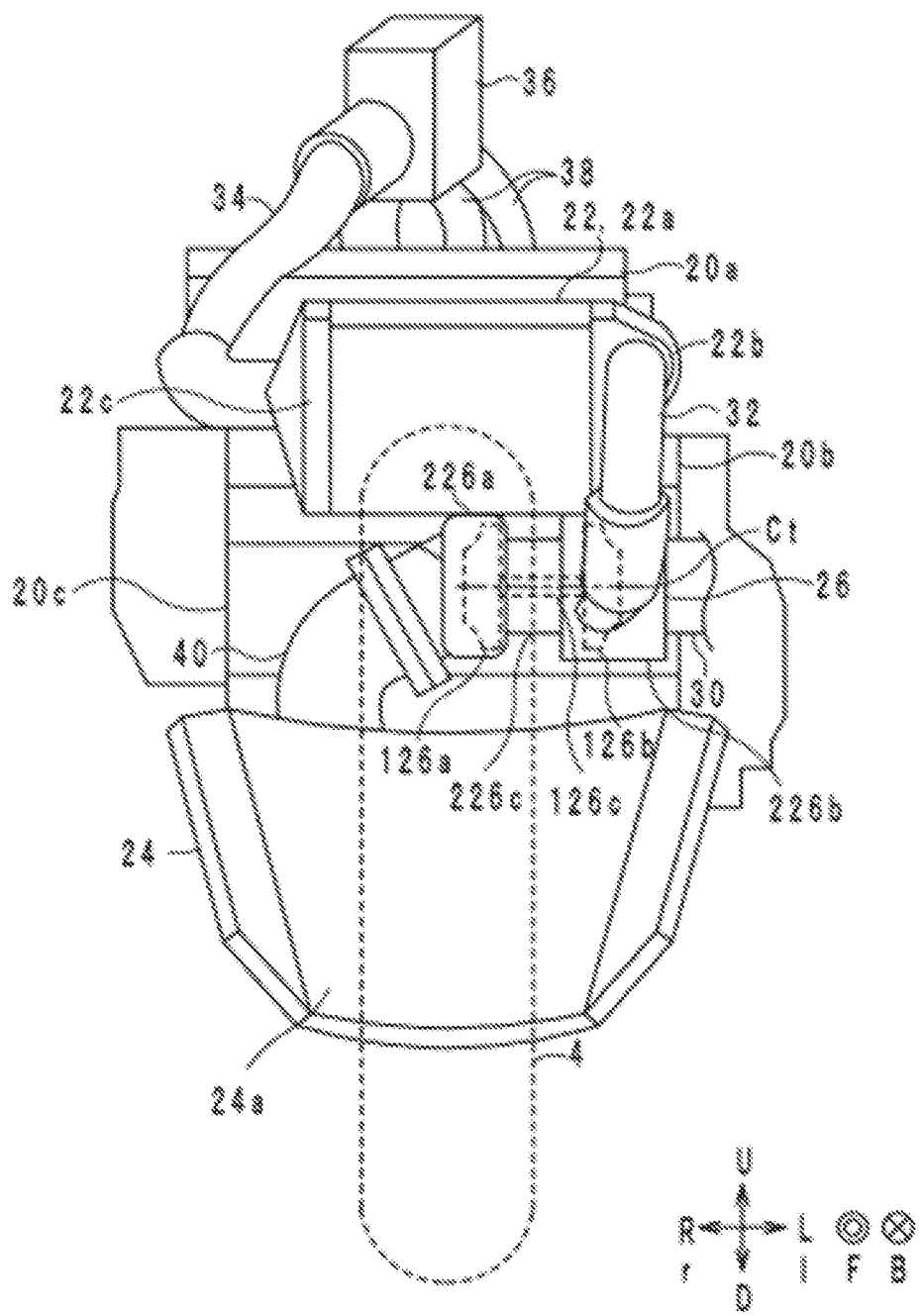
FIG. 4 is another front view of the engine unit 10 of the straddled vehicle 1.

Next, the structure of the engine unit 10 will be described with reference to the drawings. FIG. 2 is a right side view of the engine unit 10 of the straddled vehicle 1. FIGS. 3 and 4 are front views of the engine unit 10 of the straddled vehicle 1. FIG. 4 shows an intercooler 22 and a radiator 24, while FIG. 3 does not show the intercooler 22 and the radiator 24.

The engine unit 10 is a parallel three-cylinder engine. The engine unit 10 is a four-stroke engine. Accordingly, the engine unit 10 performs an intake step, a compression step, a combustion step, and an exhaust step while the piston is reciprocated twice. The engine unit 10 includes an engine body 20, an intercooler 22, a radiator 24, a turbocharger 26, an upper intake pipe 30 (FIG. 3), a middle intake pipe 32, a lower intake pipe 34, a throttle body 36, an intake manifold 38, and an exhaust device 40.

The engine body 20, when viewed from a leftward (L) or rightward (R) position, is positioned more backward B than the front wheel 4. In the present embodiment, the engine body 20 and the front wheel 4 do not overlap when seen in a backward direction (B). The engine body 20 includes a cylinder head cover 20a, a cylinder head 20b, a cylinder block 20c, a crank case 20d, an oil pan 20e, a crankshaft 20f, a balance shaft 20g, and a transmission 20h. Further, the engine body 20 includes a left intake valve, a center intake valve, a right intake valve, a left exhaust valve, a center exhaust valve, a right exhaust valve, an intake-side camshaft, an exhaust-side camshaft, a left piston, a center piston, a right piston, a left conrod, a center conrod and a right conrod, although these parts are not shown in the drawings. However, the engine body 20 does not include an oil filter or engine accessories.

The cylinder block 20c has a left cylinder bore 202l, a center cylinder bore 202c, and a right cylinder bore 202r. More specifically, the left cylinder bore 202l, the center cylinder bore 202c, and the right cylinder bore 202r, which are shaped like circular cylinders, are located in the upper part of the cylinder block 20c. The left cylinder bore 202l, the center cylinder bore 202c, and the right cylinder bore 202r are arranged side-by-side in a line in Left-Right Direction LR. The center cylinder bore 202c is positioned more rightward R than the left cylinder bore 202l. The right cylinder bore 202r is positioned more rightward R than the center cylinder bore 202c.

The left cylinder bore 202l has a central axis, which will hereinafter be referred to as a left cylinder axis CyLl. The center cylinder bore 202c has a central axis, which will hereinafter be referred to as a center cylinder axis CyLc. The right cylinder bore 202r has a central axis, which will hereinafter be referred to as a right cylinder axis CyLr. The left cylinder axis CyL1, the center cylinder axis CyLc, and the right cylinder axis CyLr extend in Up-Down Direction UD. In the present embodiment, the left cylinder axis CyL1, the center cylinder axis CyLc, and the right cylinder axis CyLr are inclined from Up-Down Direction UD in Forward Direction F by an angle θ. The angle θ is equal to or smaller than 45 degrees. The left cylinder axis CyL1, the center cylinder axis CyLc, and the right cylinder axis CyLr are not inclined from Up-Down Direction UD in Leftward Direction L or Rightward Direction R. The left cylinder bore 202l, the center cylinder bore 202c, and the right cylinder bore 202r are not necessarily shaped like circular cylinders and may be shaped like elliptic cylinders. In this case, each of the left cylinder axis CyL1, the center cylinder axis CyLc, and the right cylinder axis CyLr is a line passing through the midpoint of the two focal points of the ellipse.

The direction in which the right cylinder axis CyLr extends is defined as Up-Down Direction ud (cylinder-axis-upward-downward direction). When viewed from a leftward (L) or rightward (R) position, the direction that is perpendicular to the right cylinder axis CyLr is defined as Front-Back Direction fb (cylinder-axis-forward-backward direction). The direction that is perpendicular to Up-Down Direction ud and Front-Back Direction fb is defined as Left-Right Direction lr (cylinder-axis-leftward-rightward direction). Left-Right Direction lr corresponds to leftward-rightward direction LR. Upward along Up-Down Direction ud is referred to as upward u (cylinder-axis-upward). Downward along Up-Down Direction ud is referred to as downward d (cylinder-axis-downward). Forward or frontward along Front-Back Direction fd is defined as forward or frontward f (cylinder-axis-forward). Backward or rearward along Front-Back Direction fb is referred to as backward or rearward b (cylinder-axis-backward). Leftward along Left-Right Direction lr is referred to as leftward l (cylinder-axis-leftward). Rightward along Left-Right Direction lr is referred to as rightward r (cylinder-axis-rightward).

The left piston (not shown) is positioned within the left cylinder bore 202l. The left piston is connected to the crankshaft 20f via the left conrod (not shown). The left piston is reciprocated in Up-Down Direction ud within the left cylinder bore 202l according to the rotation of the crankshaft 20f (which will be described later).

The center piston (not shown) is positioned within the center cylinder bore 202c. The center piston is connected to the crankshaft 20f via the center conrod (not shown). The center piston is reciprocated in Up-Down Direction ud within the center cylinder bore 202c according to the rotation of the crankshaft 20f (which will be described later).

The right piston (not shown) is positioned within the right cylinder bore 202r. The right piston is connected to the crankshaft 20f via the right conrod (not shown). The right piston is reciprocated in Up-Down Direction ud within the right cylinder bore 202r according to the rotation of the crankshaft 20f (which will be described later).

The lower part of the cylinder block 20c forms an upper part of a crank housing in which the crankshaft 20f and the balance shaft 20g are contained. Therefore, the lower part of the cylinder block 20c functions as a crank housing upper part.

A crank case 20d is positioned more downward d than the cylinder block 20c. The crank case 20d is fixed to the cylinder block 20c. Accordingly, the cylinder block 20c is fixed to the crank case 20d. The crank case 20d consists of a lower part of the crank housing in which the crankshaft 20f and the balance shaft 20g are contained. Therefore, the crank case 20d functions as a crank case lower part. Thus, the lower part of the cylinder block 20c and the crank case 20d form a crank housing.

The cylinder block 20c and the crank case 20d support the crankshaft 20f. The crankshaft 20f is rotatable on a crankshaft axis Cr extending in Left-Right Direction lr. When seen in a leftward direction (l), the crankshaft axis Cr exists in the bonding plane between the cylinder block 20c and the crank case 20d. In addition, the crankshaft axis Cr intersects with the left cylinder axis CyLl, the center cylinder axis CyLc and the right cylinder axis CyLr. The shape of the crankshaft 20f is a common crankshaft shape, and any detailed description of the shape of the crankshaft 20f is not herein provided.

The transmission 20h transmits the rotation of the crankshaft 20f to the rear wheel 6. The transmission 20h changes the rotation speed and torque of the crankshaft 20f. The transmission 20h is positioned more backward B than the crankshaft 20f. The transmission 20h is contained in the crankshaft housing formed of the lower part of the cylinder block 20c and the crank case 20d.

The balance shaft 20g is rotatable on a balance-shaft axis Cb extending in Left-Right Direction lr. The balance shaft 20g is connected to the crankshaft 20f via a gear. The balance shaft 20g rotates at a speed that is two times as high as the rotation speed of the crankshaft 20f. Thereby, the balance shaft 20g cancels out secondary oscillation of the engine body 20. The balance shaft 20g is positioned more downward D than the crankshaft 20f as shown in FIG. 2. In the present embodiment, the balance shaft 20g is also positioned more downward d than the crankshaft 20f.

The oil pan 20e is positioned more downward d than the crank case 20d. The oil pan 20e is fixed to the crank case 20d. The oil pan 20e is shaped like a tray. A lubricating oil is stored in the oil pan 20e.

The cylinder head 20b is positioned more upward u than the cylinder block 20c. The cylinder head 20b is fixed to the cylinder block 20c. The cylinder head 20b includes a cylinder head body 20ba and an exhaust manifold 20bb. The cylinder head body 20ba includes a left combustion chamber 200l, a center combustion chamber 200c, a right combustion chamber 200r, a left intake port IPl, a center intake port IPc, a right intake port IPr, a left exhaust port EPl, a center exhaust port EPc, and a right exhaust port EPr.

The left combustion chamber 200l, the center combustion chamber 200c, and the right combustion chamber 200r are connected to the left cylinder bore 202l, the center cylinder bore 202c, and the right cylinder bore 202r, respectively. Accordingly, the number of combustion chambers (the left combustion chamber 200l, the center combustion chamber 200c, and the right combustion chamber 200r) is the same as the number of cylinder bores (the left cylinder bore 202l, the center cylinder bore 202c, and the right cylinder bore 202r). The left combustion chamber 200l, the center combustion chamber 200c, and the right combustion chamber 200r are arranged side-by-side in a line in Left-Right Direction LR. The center combustion chamber 200c is positioned more rightward R than the left combustion chamber 200l. The right combustion chamber 200r is positioned more rightward R than the center combustion chamber 200c.

The left combustion chamber 200l is a space enclosed by a left piston (not shown) positioned at the upper dead point, the cylinder head body 20ba, the left intake valve (not shown) and the left exhaust valve (not shown). The left combustion chamber 200l is connected to the left cylinder bore 202l. The left combustion chamber 200l is a space where a gas mixture of air and fuel (for example, gasoline) burns. The left intake port IPl is a hole connecting the outside of the cylinder head body 20ba and the left combustion chamber 200l. The left intake port IPl leads the intake air to the left combustion chamber 200l. Accordingly, the intake air flows through the left intake port IPl. The left intake port IPl has an open end on the back surface of the cylinder head body 20ba. The left exhaust port EPl is a hole connecting the outside of the cylinder head body 20ba and the left combustion chamber 200l. The left exhaust port EPl leads the exhaust air generated by the combustion of the gas mixture to the outside of the cylinder head body 20ba. Accordingly, the exhaust air flows through the left exhaust port EPl. Thus, the left exhaust port EPl is a part of an exhaust passage in which the exhaust air flows. The left exhaust port EPl has an open end on the front surface of the cylinder head body 20ba. Therefore, a left head-body-exhaust-outlet 20b1l exists on the front surface of the cylinder head body 20ba, and the exhaust air flows out through the left head-body-exhaust-outlet 20b1l. In this way, the exhaust air flows out of the cylinder head body 20ba.

The center combustion chamber 200c is a space enclosed by a center piston (not shown) positioned at the upper dead point, the cylinder head body 20ba, the center intake valve (not shown) and the center exhaust valve (not shown). The center combustion chamber 200c is connected to the center cylinder bore 202c. The center combustion chamber 200c is a space where a gas mixture of air and fuel (for example, gasoline) burns. The center intake port IPc is a hole connecting the outside of the cylinder head body 20ba and the center combustion chamber 200c. The center intake port IPc leads the intake air to the center combustion chamber 200c. Accordingly, the intake air flows through the center intake port IPl. The center intake port IPc has an open end on the back surface of the cylinder head body 20ba. The center exhaust port EPc is a hole connecting the outside of the cylinder head body 20ba and the center combustion chamber 200c. The center exhaust port EPc leads the exhaust air generated by the combustion of the gas mixture to the outside of the cylinder head body 20ba. Accordingly, the exhaust air flows through the center exhaust port EPc. Thus, the center exhaust port EPc is a part of the exhaust passage in which the exhaust air flows. The center exhaust port EPc has an open end on the front surface of the cylinder head body 20ba. Therefore, a center head-body exhaust outlet 20b1c exists on the front surface of the cylinder head body 20ba, and the exhaust air flows out through the center head-body exhaust outlet 20b1c. In this way, the exhaust air flows out of the cylinder head body 20ba.

The right combustion chamber 200r is a space enclosed by a right piston (not shown) positioned at the upper dead point, the cylinder head body 20ba, the right intake valve (not shown) and the right exhaust valve (not shown). The right combustion chamber 200r is connected to the right cylinder bore 202r. The right combustion chamber 200r is a space where a gas mixture of air and fuel (for example, gasoline) burns. The right intake port IPr is a hole connecting the outside of the cylinder head body 20ba and the right combustion chamber 200l. The right intake port IPr leads the intake air to the right combustion chamber 200r. Accordingly, the intake air flows through the right intake port IPr. The right intake port IPr has an open end on the back surface of the cylinder head body 20ba. The right exhaust port EPr is a hole connecting the outside of the cylinder head body 20ba and the right combustion chamber 200r. The right exhaust port EPr leads the exhaust air generated by the combustion of the gas mixture to the outside of the cylinder head body 20ba. Accordingly, the exhaust air flows through the right exhaust port EPr. Thus, the right exhaust port EPr is a part of the exhaust passage in which the exhaust air flows. The right exhaust port EPr has an open end on the front surface of the cylinder head body 20ba. Therefore, a right head-body-exhaust-outlet 20b1r exists on the front surface of the cylinder head body 20ba, and the exhaust air flows out through the right head-body exhaust outlet 20b1r. In this way, the exhaust air flows out of the cylinder head body 20ba.

The left intake valve (not shown) is positioned at the boundary between the left intake port IPl and the left combustion chamber 200l. When the left intake valve is open, the left intake port IPl and the left combustion chamber 200l are connected. Thereby, the intake air flows from the left intake port IPl into the left combustion chamber 200l. When the left intake valve is closed, the flow of intake air from the left intake port IPl into the left combustion chamber 200l is blocked. In the same manner, the center intake valve (not shown) is positioned at the boundary between the center intake port IPc and the center combustion chamber 200c. When the center intake valve is open, the center intake port IPc and the center combustion chamber 200c are connected. Thereby, the intake air flows from the center intake port IPc into the center combustion chamber 200c. When the center intake valve is closed, the flow of intake air from the center intake port IPc into the center combustion chamber 200c is blocked. Also, the right intake valve (not shown) is positioned at the boundary between the right intake port IPr and the right combustion chamber 200r.

When the right intake valve is open, the right intake port IPr and the right combustion chamber 200r are connected. Thereby, the intake air flows from the right intake port IPr into the right combustion chamber 200r. When the right intake valve is closed, the flow of intake air from the right intake port IPr into the right combustion chamber 200r is blocked.

The left exhaust valve (not shown) is positioned at the boundary between the left exhaust port EPl and the left combustion chamber 200l. When the left exhaust valve is open, the left exhaust port EPl and the left combustion chamber 200l are connected. Thereby, the exhaust air flows from the left combustion chamber 200l into the left exhaust port EPl. When the left exhaust valve is closed, the flow of exhaust air from the left combustion chamber 200l into the left exhaust port EPl is blocked. In the same manner, the center exhaust valve (not shown) is positioned at the boundary between the center exhaust port EPc and the center combustion chamber 200c. When the center exhaust valve is open, the center exhaust port EPc and the center combustion chamber 200c are connected. Thereby, the exhaust air flows from the center combustion chamber 200c into the center exhaust port EPc. When the center exhaust valve is closed, the flow of exhaust air from the center combustion chamber 200c into the center exhaust port EPc is blocked. Also, the right exhaust valve (not shown) is positioned at the boundary between the right exhaust port EPr and the right combustion chamber 200r. When the right exhaust valve is open, the right exhaust port EPr and the right combustion chamber 200r are connected. Thereby, the exhaust air flows from the right combustion chamber 200r into the right exhaust port EPr. When the right exhaust valve is closed, the flow of exhaust air from the right combustion chamber 200r into the right exhaust port EPr is blocked.

The cylinder head body 20ba supports an intake-side camshaft (not shown) and an exhaust-side camshaft (not shown). The intake-side camshaft and the exhaust-side camshaft are arranged in Front-Back Direction fb. The intake-side camshaft is positioned more backward b than the exhaust-side camshaft. The intake-side camshaft is rotatable on an axis extending in Left-Right Direction lr. Accordingly, the intake-side camshaft is able to open and close the left intake valve, the center intake valve and the right intake valve. The exhaust-side camshaft is rotatable on another axis extending in Left-Right Direction lr. Accordingly, the exhaust-side camshaft is able to open and close the left exhaust valve, the center exhaust valve and the right exhaust valve.

The exhaust manifold 20bb is positioned more frontward f than the cylinder head body 20ba. The exhaust manifold 20bb is fixed to the cylinder head body 20ba. In the present embodiment, the exhaust manifold 20bb is formed integrally with the cylinder head body 20ba. Therefore, it is impossible to separate the exhaust manifold 20bb from the cylinder head body 20ba without breaking the cylinder head body 20ba and the exhaust manifold 20bb.

The exhaust manifold 20bb includes a cylinder-head exhaust outlet 20bb1. The exhaust air flowing from the left combustion chamber 200l, the center combustion chamber 200c and the right combustion chamber 200r flows out of the cylinder head 20b through the cylinder-head exhaust outlet 20bb1. There exists only one cylinder-head exhaust outlet 20bb1. Accordingly, the number of cylinder-head exhaust outlets 20bb1 is smaller than the number of combustion chambers (the left combustion chamber 200l, the center combustion chamber 200c and the right combustion chamber 200r). In addition, the exhaust manifold 20bb includes an exhaust passage that connects the left combustion chamber 200l, the center combustion chamber 200c and the right combustion chamber 200r to the cylinder-head exhaust outlet 20bb1, of which the number is smaller than the number of combustion chambers (the left combustion chamber 200l, the center combustion chamber 200c and the right combustion chamber 200r). The exhaust passage is a space enclosed by the inner surface of the exhaust manifold 20bb. Thus, the exhaust manifold 20bb joins the three exhaust passages, namely, the left exhaust port EPl, the center exhaust port EPc and the right exhaust port EPr, into one exhaust passage.

As shown in FIG. 2, the exhaust manifold 20bb extends from the cylinder head 20ba in a diagonal manner forward f and downward d. The end in the front-downward direction of the exhaust manifold 20bb is positioned more frontward f than the cylinder block 20c. The cylinder-head exhaust outlet 20bb1 is formed at the front-lower (fd) end of the exhaust manifold 20bb. The cylinder-head exhaust outlet 20bb1 has an open end facing front-downward fd. Accordingly, the exhaust air flows downward D from the cylinder-head exhaust outlet 20bb1. In the present embodiment, the exhaust air flows downward D from the cylinder-head exhaust outlet 20bb1.

The cylinder head cover 20a is positioned more upward u than the cylinder head 20b. The cylinder head cover 20a is fixed to the cylinder head 20b. The cylinder head cover 20a covers the intake-side camshaft (not shown) and the exhaust-side camshaft (not shown). The surface of the cylinder head 20b on which the cylinder cover is fixed will hereinafter be referred to as a cylinder-head-cover-fixed surface Sa (i.e., the "first surface"). The cylinder-head-cover-fixed-surface Sa is a part of the cylinder head 20b. The surface of the cylinder head cover 20a on which the cylinder head 20b is fixed will hereinafter be referred to as a cylinder-head-fixed surface Sb. The cylinder-head-fixed-surface Sb is a part of the cylinder head surface 20a. The cylinder-head-cover-fixed surface Sa and the cylinder-head-fixed surface Sb are lines extending in Front-Back Direction FB when viewed from a leftward (L) or rightward (R) position. However, when viewed from a leftward (L) or rightward (R) position, the rear end of the cylinder-head-cover-fixed surface Sa and the rear end of the cylinder-head-fixed surface Sb are positioned above (U) the front end Pf1 of the cylinder-head-cover-fixed surface Sa and the front end of the cylinder-head-fixed surface Sb, respectively.

The engine body 20 having the above structure is made of, for example, iron. However, the engine body 20 may be made of aluminum, an aluminum alloy, or iron and aluminum. When the engine body 20 is made of iron and aluminum, some part of the engine body 20 is made of iron, and the other part of the engine body 20 is made of aluminum. The engine body 20 is made by casting, for example. In the present embodiment, especially, the cylinder head body 20ba and the exhaust manifold 20bb are made as one whole piece during the casting process.

The upper intake pipe 30 (see FIG. 3), the turbocharger 26, the middle intake pipe 32, the lower intake pipe 34, the throttle body 36, and the intake manifold 38 are conduits in which the intake air flows. The end of each member which the intake air flows through first will hereinafter be referred to as an upstream end. The end of each member which the intake air flows through last will hereinafter be referred to as a downstream end.

As shown in FIG. 4, the upper intake pipe 30, the turbocharger 26, the middle intake pipe 32, the intercooler 22 (which will be described later), the lower intake pipe 34, the throttle body 36, and the intake manifold 38 are arranged in line in this order from upstream to downstream of the flow of the intake air (along with the flow of the intake air). More specifically, the upstream end of the upper intake pipe 30 is connected to an air cleaner box (not shown). The downstream end of the upper intake pipe 30 is connected to the turbocharger 26. The upstream end of the middle intake pipe 32 is connected to the turbocharger 26. The downstream end of the middle intake pipe 32 is connected to the intercooler 22. The upstream end of the lower intake pipe 34 is connected to the intercooler 22. The downstream end of the lower intake pipe 34 is connected to the throttle body 36. The upstream end of the intake manifold 38 is connected to the throttle body 36. The downstream end of the intake manifold 38 is connected to the upstream end of the left intake port IPl (see FIG. 2), the upstream end of the center intake port IPc (see FIG. 2), the upstream end of the right intake port IPr (see FIG. 2). Outside air is taken into the air cleaner box (not shown) of the straddled vehicle 1. Thereafter, the intake air flows through the air cleaner box, the upper intake pipe 30, the turbocharger 26, the middle intake pipe 32, the intercooler 22, the lower intake pipe 34, the throttle body 36, and the intake manifold 38, and the intake air diverges and flows through the left intake port IPl, the center intake port IPc and the right intake port IPr into the left combustion chamber 200*l*, the center combustion chamber 200*c* and the right combustion chamber 200*r*.

The throttle body 36 adjusts the volume of intake air flowing into the intake manifold 38. The throttle body 36 has a common structure for a common throttle body, and any detailed description of the structure of the throttle body 36 is not herein provided.

A left injector (not shown) is supported by the cylinder head 20*b*. The lower end of the left injector is positioned in the left combustion chamber 200*l*. The left injector injects fuel into the left combustion chamber 200*l*. Thereby, the fuel is mixed with the intake air flowing into the left combustion chamber 200*l* and turns into a gas mixture. Also, a left spark plug (not shown) is supported by the cylinder head 20*b*. The lower end of the left spark plug is positioned in the left combustion chamber 200*l*. The left spark plug ignites the gas mixture in the left combustion chamber 200*l*.

A center injector (not shown) is supported by the cylinder head 20*b*. The lower end of the center injector is positioned in the center combustion chamber 200*c*. The center injector injects fuel into the center combustion chamber 200*c*. Thereby, the fuel is mixed with the intake air flowing into the center combustion chamber 200*c* and turns into a gas mixture. Also, a center spark plug (not shown) is supported by the cylinder head 20*b*. The lower end of the center spark plug is positioned in the center combustion chamber 200*c*. The center spark plug ignites the gas mixture in the center combustion chamber 200*c*.

A right injector (not shown) is supported by the cylinder head 20*b*. The lower end of the right injector is positioned in the right combustion chamber 200*r*. The right injector injects fuel into the right combustion chamber 200*r*. Thereby, the fuel is mixed with the intake air flowing into the right combustion chamber 200*r* and turns into a gas mixture. Also, a right spark plug (not shown) is supported by the cylinder head 20*b*. The lower end of the right spark plug is positioned in the right combustion chamber 200*r*. The right spark plug ignites the gas mixture in the right combustion chamber 200*r*.

The exhaust device 40 is a pipe in which the exhaust air flows. The exhaust device 40 includes an exhaust pipe, a muffler and a catalyst. Any detailed descriptions of the exhaust pipe, the muffler and the catalyst are not herein provided. The end of each member which the exhaust air flows through first will hereinafter be referred to as an upstream end. The end of each member which the exhaust air flows through last will hereinafter be referred to as a downstream end. As shown in FIG. 2, the exhaust manifold 20*bb*, the turbocharger 26 and the exhaust device 40 are arranged in line in this order from upstream to downstream of the flow of the exhaust air (along with the flow of the exhaust air). More specifically, the upstream end of the exhaust manifold 20*bb* is connected to the left exhaust port EPl, the center exhaust port EPc and the right exhaust port EPr. The downstream end of the exhaust manifold 20*bb* is connected to the turbocharger 26. The upstream end of the exhaust device 40 is connected to the turbocharger 26. Thereby, the exhaust air flows from the left combustion chamber 200*l*, the center combustion chamber 200*c* and the right combustion chamber 200*r* into the left exhaust port EPl, the center exhaust port EPc and the right exhaust port EPr, respectively. The exhaust air flows from the left exhaust port EPl, the center exhaust port EPc and the right exhaust port EPr to the exhaust manifold 20*bb* and thereafter flows through the turbocharger 26 and the exhaust device 40. Then, the exhaust air flows out of the straddled vehicle 1. Thus, the turbocharger 26 and the exhaust device 40 are also parts of the exhaust passage in which the exhaust air flows.

The engine body 20 is cooled by an engine coolant flowing through the engine body 20. The end of each member which the coolant flows through first will hereinafter be referred to as an upstream end. The end of each member which the coolant flows through last will hereinafter be referred to as a downstream end.

For the engine body 20, an engine water jacket EWJ in which the coolant for cooling the engine body 20 flows, is provided. The engine water jacket EWJ is formed in the engine body 20. FIG. 2 shows the part of the engine water EWJ formed in the cylinder head body 20*ba* and the exhaust manifold 20*bb*.

The downstream end of the engine water jacket EWJ is connected to the upstream end of the radiator 24 via a radiator upper hose (not shown). The upstream end of the engine water jacket EWJ is connected to the downstream end of the radiator 24 via a radiator lower hose (not shown). Also, a water pump (not shown) is provided for the engine body 20. The water pump is driven by a drive force generated by the engine body 20 and circulates the coolant between the engine body 20 and the radiator 24.

The radiator 24 cools the coolant for cooling the engine body 20. More specifically, the coolant cools the engine body 20 by flowing in the engine water jacket EWJ of the engine body 20. During this process, the coolant is heated by the engine body 20. The coolant heated by the engine body 20 flows into the radiator 24 via the radiator upper hose. The radiator 24 cools the coolant heated by the engine body 20. The coolant cooled by the radiator 24 flows into the engine water jacket EWJ of the engine body 20 via the radiator lower hose.

The radiator 24 includes a radiator core 24*a*. As shown in FIG. 2, the radiator core 24*a* is like a plate and has two main surfaces, namely, a first main surface S1, which has a normal vector in Forward Direction F, and a second main surface S2, which has a normal vector in Backward Direction B. In the present embodiment, the radiator core 24*a* is like a plate, which is rectangular when seen in a backward direction (B). However, the radiator core 24*a* is slightly curved in such a manner that the center portion of the radiator core 24*a* with respect to Left-Right Direction LR bulges backward B from the left end and the right end of the radiator core 24a. This prevents the radiator core 24a from coming into contact with the front wheel 4. In addition, the radiator core 24a is inclined backward B from Up-Down Direction UD. Accordingly, the first main surface S1 is inclined from backward B from Up-Down Direction UD, and the upper end of the first main surface S1 is entirely positioned more backward B than the lower end of the first main surface S1.

The radiator core 24a includes radiator fins and a plurality of tubes. The radiator core 24a does not include the radiator upper hose and the radiator lower hose, a radiator cap, a reservoir tank, an upper tank, a lower tank and an electric fan. The tubes are arranged in the radiator core 24a, for example, so as to extend in Left-Right Direction lr. The radiator fins are arranged in such a manner to be in contact with the tubes. When the straddled vehicle 1 is moving, the wind blows to the radiator core 24a from the front F. The wind cools the coolant flowing in the tubes.

The radiator 24 with the above-described structure is positioned in a place where the radiator 24 is likely to be exposed to the wind blowing from the front F of the straddle vehicle 1 when the straddle vehicle 1 is moving. Accordingly, as shown in FIG. 2, the radiator 24 is positioned more backward B than the front wheel 4 and more frontward F than the crank case 20d and the oil pan 20e of the engine body 20. As shown in FIG. 4, when seen in a backward direction (B), the center of the radiator core 24a with respect to Left-Right Direction lr is behind the front wheel 4.

[Structure of Turbocharger]

Next, the structure of the turbocharger 26 will be described with reference to FIGS. 2 to 4. The turbocharger 26 compresses the intake air by using the exhaust air flowing out of the engine body 20 and supplies the compressed intake air to the engine body 20. The turbocharger 26 will hereinafter be described in more detail.

As shown in FIG. 3, the turbocharger 26 includes a turbine wheel 126a, a compressor wheel 126b, a shaft 126c and a turbocharger case 226. The turbine wheel 126a is rotatable on a turbocharger rotation axis Ct by the exhaust air from the engine body 20. The turbocharger rotation axis Ct extends in Left-Right Direction LR. As shown in FIG. 2, when seen in a leftward direction (L), the turbine wheel 126a is circular. The turbine wheel 126a has a plurality of blades.

The compressor wheel 126b is rotated on the turbocharger rotation axis Ct by the rotation of the turbine wheel 126a and compresses the exhaust air. The compressor wheel 126b is positioned more leftward L than the turbine wheel 126a. When seen in a rightward direction (R), the compressor wheel 126b is circular. The compressor wheel 126b has a plurality of blades. The shaft 126c is a bar-like member extending in Left-Right Direction LR. The shaft 126c connects the turbine wheel 126a and the compressor wheel 126b. Accordingly, the turbine wheel 126a and the compressor wheel 126b are rotatable together on the turbocharger rotation axis Ct.

The turbocharger case 226 contains the turbine wheel 126a, the compressor wheel 126b and the shaft 126c. The turbocharger case 226 is made of, for example, iron. The turbocharger case 226 includes a turbine housing 226a, a compressor housing 226b, and a center housing 226c. The center housing 226c is shaped like a cylinder, which has an axis extending in Left-Right Direction LR. The center housing 226c supports the shaft 126c via a bearing (not shown). The shaft 126c is rotatable on the turbocharger rotation axis Ct relative to the center housing 226c.

The turbine housing 226a is positioned more rightward R than the center housing 226c. The turbine housing 226a is fixed to the center housing 226c. The turbine housing 226a contains the turbine wheel 126a. In addition, as shown in FIG. 3, the downstream end of the exhaust manifold 20bb is connected to the upper surface of the turbine housing 226a. Accordingly, the turbocharger case 226 (turbocharger 26) is fixed to the exhaust manifold 20bb (cylinder head 20b) so as to receive the exhaust air flowing out through the at least one cylinder-head exhaust outlet 20bb1, of which the number is smaller than the number of the combustion chambers (the left combustion chamber 200l, the center combustion chamber 200c and the right combustion chamber 200r).

The surface of the turbocharger case 226 on which the exhaust manifold 20bb (cylinder head 20b) is fixed will hereinafter be referred to as a cylinder-head-fixed surface Sc (i.e., the "third surface"). The cylinder-head-fixed surface Sc is a part of the turbocharger case 226 (turbocharger 26). The surface of the exhaust manifold 20bb (cylinder head 20b) on which the turbocharger case 226 (turbocharger 26) is fixed will hereinafter be referred to as a turbocharger-fixed surface Sd (i.e., the "second surface"). The turbocharger-fixed surface Sd is a part of the exhaust manifold 20bb (cylinder head 20b). The cylinder head-fixed surface Sc and the turbocharger-fixed surface Sd are substantially parallel to a plane perpendicular to Up-Down Direction UD (parallel to a horizontal plane). However, the front end of the cylinder-head-fixed surface Sc and the front end of the turbocharger-fixed surface Sd are positioned a little more downward than the rear end of the cylinder-head-fixed surface Sc and the rear end of the turbocharger-fixed surface Sd, respectively.

The upstream end of the turbine housing 226a is on the cylinder-head-fixed surface Sc. In the present embodiment, a flange positioned at the upstream end of the turbine housing 226a and a flange at the downstream end of the exhaust manifold 20bb are fixed together by fastening means, such as a bolt and a nut, or the like. Thereby, the turbocharger 26 is fixed to the engine body 20.

The upper surface of the exhaust device 40 is connected to the right surface of the turbine housing 226a. The downstream end of the turbine housing 226a is on the junction plane with the upstream end of the exhaust device 40. In the present embodiment, a flange at the downstream end of the turbine housing 226a and a flange at the upstream end of the exhaust device 40 are fixed together by fastening means, such as a bolt and a nut, or the like. Accordingly, the downstream end of the turbine housing 226a is where a plane exists in which the flange of the turbine housing 226a is in contact with the exhaust device 40.

The compressor housing 226b is positioned more leftward 1 than the center housing 226c. The compressor housing 226b is fixed to the center housing 226c. The compressor housing 226b contains the compressor wheel 126b. As shown in FIG. 4, the downstream end of the upper intake pipe 30 is connected to the left surface of the compressor housing 226b. As shown in FIG. 4, the upstream end of the middle intake pipe 32 is connected to the front surface of the compressor housing 226b.

The turbocharger 26 with the above-described structure operates as follows. First, the exhaust air flows from the exhaust manifold 20bb into the turbine housing 226a. The exhaust air hits the blades of the turbine wheel 126a. Thereby, the turbine wheel 126a rotates on the turbocharger rotation axis Ct. When seen in a leftward direction (L), the exhaust air flows clockwise within the turbocharger 26. Thereafter, the exhaust air flows out of the turbocharger 26 into the exhaust device 40. Thus, the turbine housing 226a is a part of the exhaust passage. The part of the exhaust passage is a space enclosed by the inner surface of the turbine housing 226a.

In addition, the compressor wheel 126b is connected to the turbine wheel 126a via the shaft 126c. Therefore, the compressor wheel 126b rotates on the turbocharger rotation axis Ct with the rotation of the turbine wheel 126a. The intake air flows from the upper intake pipe 30 into the compressor housing 226b. The intake air is compressed by the blades of the compressor wheel 126b. The compressed intake air flows out of the compressor housing 226b into the middle intake pipe 32.

Now the position of the turbocharger 26 will be described. As shown in FIG. 2, the turbocharger 26 is positioned more frontward F than engine body 20 when viewed from a leftward (L) or rightward (R) position. In the present embodiment, the turbocharger 26 is positioned more frontward F than the engine body 20. In addition, the turbocharger 26 is positioned more backward B than the front wheel 4 when viewed from a leftward (L) or rightward (R) position. In the present embodiment, the turbocharger 26 is positioned more backward B than the front wheel 4. As shown in FIG. 3, when seen in a backward direction (B), the turbocharger 26 is at least partly within the area of the engine body 20. In the present embodiment, when seen in a backward direction (B), the turbocharger 26 is entirely within the area of the engine body 20. As shown in FIG. 4, when seen in a backward direction (B), the turbocharger 26 is positioned more upward U than the radiator 24.

As shown FIG. 2, a horizontal plane in which the front axle Axf exists will hereinafter referred to as a front-axle horizontal plane Sx (i.e., the "first horizontal plane"). The front-axle horizontal plane Sx is a horizontal plane perpendicular to Up-Down Direction UD. A horizontal plane in which the front end Pf1 of the cylinder-head-cover-fixed surface Sa exists will hereinafter be referred to as a cylinder-head-cover-fixed-surface-front-end horizontal plane Sy (i.e., the "third horizontal plane"). The cylinder-head-cover-fixed-surface-front-end horizontal plane Sy is a horizontal plane perpendicular to Up-Down Direction UD. A horizontal plane in which the crankshaft axis Cr exists will hereinafter be referred to as a crankshaft-axis horizontal plane Sz (i.e., the "second horizontal plane"). The crankshaft-axis horizontal plane Sz is a horizontal plane perpendicular to Up-Down Direction UD.

When the vehicle body frame 2 in an upright state is viewed from a leftward (L) or rightward (R) position, the turbocharger rotation axis Ct, the cylinder-head-fixed surface Sc and the turbocharger-fixed surface Sd are above (U) the front-axle horizontal plane Sx and the crankshaft-axis horizontal plane Sz. When the vehicle body frame 2 in an upright state is viewed from a leftward (L) or rightward (R) position, the turbocharger rotation axis Ct, the cylinder-head-fixed surface Sc and the turbocharger-fixed surface Sd are also positioned below (D) the cylinder-head-cover-fixed-surface-front-end horizontal plane Sy. Therefore, when viewed from a leftward (L) or rightward (R) position, the turbocharger rotation axis Ct, the cylinder-head-fixed surface Sc and the turbocharger-fixed surface Sd are positioned within the area enclosed by the front wheel 4, the engine body 20, the cylinder-head-cover-fixed-surface-front-end horizontal plane Sy and the crankshaft-axis horizontal plane Sz.

Further, when viewed from a leftward (L) or rightward (R) position, the front end Pf2 of the turbocharger-fixed surface Sd is entirely positioned more frontward F than the turbocharger rotation axis Ct. In the present embodiment, when viewed from a leftward (L) or rightward (R) position, the front end Pf2 of the turbocharger-fixed surface Sd is entirely positioned more frontward f than the turbocharger rotation axis Ct. When viewed from a leftward (L) or rightward (R) position, the rear end Pb2 of the turbocharger-fixed surface Sd is entirely positioned more backward B than the turbocharger rotation axis Ct. Further, when viewed from a leftward (L) or rightward (R) position, the rear end Pb2 of the turbocharger-fixed surface Sd is entirely positioned more backward b than the turbocharger rotation axis Ct.

The turbocharger rotation axis Ct is positioned below (D) the cylinder-head-fixed surface Sc and the turbocharger-fixed surface Sd. In the present embodiment, the turbocharger rotation axis Ct is positioned more downward D than the cylinder-head-fixed surface Sc and the turbocharger-fixed surface Sd.

When viewed from a leftward (L) or rightward (R) position, the distance L1 between the front end Pf2 of the turbocharger-fixed surface Sd (which is positioned above (U) the front-axle horizontal plane Sx and the crankshaft-axis horizontal plane Sz and below (D) the cylinder-head-cover-fixed-surface-front-end horizontal plane Sy) and the left cylinder axis CyLl, the center cylinder axis CyLc or the right cylinder axis CyLr is longer than the distance L2 between the front end PF1 of the cylinder-head-cover-fixed surface Sa and the left cylinder axis CyLl, the center cylinder axis CyLc or the right cylinder axis CyLr. Therefore, the front end Pf2 of the turbocharger-fixed surface Sd is entirely more forward f than the front end Pf1 of the cylinder-head-cover-fixed surface Sa. In the present embodiment, the front end Pf2 of the turbocharger-fixed surface Sd is entirely positioned more frontward F than the front end Pf1 of the cylinder-head-cover-fixed surface Sa.

The above-described turbocharger 26 is fixed to the engine body 20 via a stay 300. As shown in FIG. 2, the stay 300 is included in the engine unit 10. The stay 300 is a metallic member that is used to fix the turbocharger 26 to the engine body 20. The stay 300 is fixed on the front surface of the cylinder block 20c via a screw or any other fastening means. The stay 300 supports the turbocharger 26. Specifically, the turbocharger 26 is fixed to the stay 300 via a screw or any other fastening means. Thereby, the turbocharger 26 is fixed to the engine body 20.

[Structure of Intercooler]

Next, the structure of the intercooler 22 will be described with reference to FIGS. 2 to 4. The intercooler 22 cools the intake air compressed by the turbocharger 26. The intercooler 22 will hereinafter be described in more detail.

As shown in FIG. 4, the intercooler 22 includes an intercooler core 22a, an inlet-side header 22b and an outlet-side header 22c. As shown in FIG. 2, the intercooler core 22a is like a plate with two main surfaces, namely, a third main surface S3 and a fourth main surface S4. The third main surface S3 has a normal vector extending forward F, and the fourth main surface S4 has a normal vector extending backward B. In the present embodiment, when seen in a backward direction (B), the intercooler core 22a has rectangular plate shape. The intercooler core 22a is inclined forward F from Up-Down Direction UD. Accordingly, the third main surface S3 is inclined forward F from the Up-Down Direction UD. The upper end of the third main surface S3 is positioned more forward F than the lower end of the third main surface S3.

The inlet-side header 22b is positioned more leftward L than the intercooler core 22a. The downstream end of the middle intake pipe 32 is connected to the inlet-side header 22b. The outlet-side header 22c is positioned more rightward R than the intercooler core 22a. The upstream end of the lower intake pipe 34 is connected to the outlet-side header 22c.

The intercooler core 22a includes radiator fins and a plurality of tubes. The inlet-side header 22b and the outlet-side header 22c are not included in the intercooler core 22a. The tubes are arranged in the intercooler core 22a, for example, so as to extend in Left-Right Direction LR. The radiator fins are arranged in such a manner to be in contact with the tubes. The intake air flows into the plurality of tubes through the intake-side header 22b. The intake air flows from the left L to the right R in the plurality of tubes. When the straddled vehicle 1 is moving, the wind blows to the intercooler core 22a from the front F. This wind cools the intake air flowing in the tubes. The cooled intake air flows into the lower intake pipe 34 through the outlet-side header 22c.

The intercooler 22 with the above-described structure is positioned in a place where the intercooler 22 is likely to be exposed to the wind blowing from the front F of the straddle vehicle 1 when the straddle vehicle 1 is moving. Therefore, as shown in FIG. 2, the intercooler 22 is positioned more backward B than the front wheel 4 and more frontward F than the engine body 20, the cylinder head cover 20a and the cylinder head 20b. As shown in FIG. 4, when seen in a backward direction (B), the lower part of the intercooler core 22a is overlapped by the upper part of the front wheel 4. The front wheel 4 is positioned at the center of the intercooler core 22a with respect to Left-Right Direction lr. In addition, as shown in FIG. 2, at least part of the intercooler core 22a is above (U) the front axle Axf of the front wheel 4. In the present embodiment, the intercooler core 22a is entirely above (U) the front axle Axf of the front wheel 4.

As shown in FIG. 4, when seen in a backward direction (B), the intercooler 22 is positioned more upward U than the radiator 24 and the turbocharger 26. Therefore, as shown in FIG. 4, when seen in a backward direction (B), the turbine wheel 126a is positioned more downward (D) than the intercooler 22. The turbine wheel 126a is entirely positioned more downward D than the intercooler 22 and more upward U than the radiator core 24a.

[Structure of Engine Water Jacket]

Next, the engine water jacket EWJ will be described with reference to FIG. 2. As mentioned above, the engine water jacket EWJ is formed in the entire engine body 20. In the present embodiment, the cylinder head body 20ba and the exhaust manifold 20bb are formed as one body. Accordingly, as shown in FIG. 2, the part of the engine water jacket EWJ that is positioned more frontward F than the front end Pf1 of the cylinder-head-cover-fixed surface Sa is formed in the cylinder head 20b. Thus, the engine water jacket EWJ is formed in the exhaust manifold 20bb in addition to the cylinder head body 20ba. Thereby, the coolant flows out of the cylinder head body 20ba into the cylinder head body 20ba through the exhaust manifold 20bb.

[Effects]

Though the straddled vehicle 1 contains the turbocharger 26, the wheelbase can be shortened. In the straddled vehicle 1, more specifically, the cylinder-head exhaust outlet 20bb1, through which the exhaust air flowing out of the left combustion chamber 200l, the center combustion chamber 200c and the right combustion chamber 200r flows out, is formed in the cylinder head 20b, and the number of cylinder-head exhaust outlets is smaller than the number of combustion chambers (the left combustion chamber 200l, the center combustion chamber 200c and the right combustion chamber 200r). In addition, in the cylinder head 20b, an exhaust passage is formed to connect the left combustion chamber 200l, the center combustion chamber 200c and the right combustion chamber 200r to the cylinder-head exhaust outlet 20bb1, of which the number is smaller than the number of combustion chambers (the left combustion chamber 200l, the center combustion chamber 200c and the right combustion chamber 200r). Therefore, the exhaust manifold 20bb contained in the cylinder head 20b interconnects a plurality of exhaust passages into one exhaust passage. The turbocharger 26 is fixed to the cylinder head 20b in such a manner that the exhaust air flowing out of the left combustion chamber 200l, the center combustion chamber 200c and the right combustion chamber 200r through the cylinder-head exhaust outlet 20bb1 (of which the number is smaller than the number of the combustion chambers) flows into the turbocharger 26. Accordingly, the turbocharger 26 is fixed to the exhaust manifold 20bb. Since the exhaust manifold 20bb is positioned in the front part of the engine body 20, the turbocharger 26 is positioned to protrude forward F from the engine body 20. In this arrangement, when viewed from a leftward (L) or rightward (R) position, the distance L1 between the front end of the turbocharger-fixed surface Sd (which is positioned above (U) the front-axle horizontal plane Sx and the crankshaft-axis horizontal plane Sz and below (D) the cylinder-head-cover-fixed-surface-front-end horizontal plane Sy) and the left cylinder axis CyLl, the center cylinder axis CyLc and the right cylinder axis CyLr is longer than the distance L2 between the front end Pf1 of the cylinder-head-cover-fixed surface Sa and the left cylinder axis CyLl, the center cylinder axis CyLc and the right cylinder axis CyLr. On such a straddled vehicle 1, the front wheel 4 is positioned away from the engine body 20 so as not to come into contact with the turbocharger 26, and consequently, the wheelbase is likely to be long.

In the area above (U) the front-axle horizontal plane Sx, the outside edge S10 of the front wheel 4 is curved forward F. Accordingly, due to the curvature of the front wheel 4, the distance between the outside edge S10 of the front wheel 4 and the engine body 20 gradually increases in a more upward (U) part from the horizontal plane Sx. Accordingly, when arranging some members that should be placed more frontward F than the engine body 20, it is easier to arrange the members in a space above (U) the front-axle horizontal plane Sx and more frontward F than the engine body 20 than to arrange the members in a space across the front-axle horizontal plane Sx and more frontward F than the engine body 20.

The engine body 20 is likely to have a greater dimension in Front-Back Direction FB on the crankshaft-axis horizontal plane Sz than the dimension in Front-Back Direction FB of the engine body 20 on a level above (U) the crankshaft-axis horizontal plane Sz. Therefore, it is also easier to arrange the members in a space above (U) the crankshaft-axis horizontal plane Sz and more frontward F than the engine body 20 than to arrange the members in a space across the crankshaft-axis horizontal plane Sz and more frontward F than the engine body 20.

The engine body 20 is likely to have greater dimension in Front-Back Direction FB on the cylinder-head-cover-fixed-surface-front-end horizontal plane Sy than the dimension in Front-Back Direction FB of the engine body 20 on a plane below (D) the cylinder-head-cover-fixed-surface-front-end horizontal plane Sy. Accordingly, when arranging some members that should be placed more frontward F than the engine body 20, it is also easier to arrange the members in a space below (D) the cylinder-head-cover-fixed-surface-front-end horizontal plane Sy and more frontward F than the engine body 20 than to arrange the members in a space across the cylinder-head-cover-fixed-surface-front-end horizontal plane Sy and more frontward F than the engine body 20.

In the straddled vehicle 1, therefore, when the vehicle body frame 2 is in an upright state, the turbocharger rotation axis Ct, the cylinder-head-fixed surface Sc and the turbocharger-fixed surface Sd are positioned above (U) the front-axle horizontal plane Sx in which the front axle Axf exists and the crankshaft-axis horizontal plane Sz in which the crankshaft axis Cr exists and below (D) the cylinder-head-cover-fixed-surface-front-end horizontal plane Sy in which the front end Pf1 of the cylinder-head-cover-fixed surface Sa exists, when viewed from a leftward (L) or rightward (R) position. Thus, in the straddled vehicle 1, when viewed from a leftward (L) or rightward (R) position, the turbocharger 26 is located so as to the members that should be placed more frontward F than the engine body 20 and more backward B than the front wheel 4 are arranged accordingly in a space that permits easy arrangement of the members. This gives more space around the turbocharger 26, and it becomes possible to place the engine body 20 and the front wheel 4 closer to each other. Therefore, even though the turbocharger 26 is contained in the straddled vehicle 1, it is possible to shorten the wheelbase.

Another reason why the wheelbase of the straddled vehicle 1, which contains the turbocharger 26, can be shortened will be described. Specifically, since the left cylinder axis CyLl, the center cylinder axis CyLc and the right cylinder axis CyLr are inclined forward F from Up-Down Direction UD, the engine body 20 is tilted forward. In this case, there exists a space more frontward F and more downward D than the engine body 20, and it is easy to arrange other members in the space. In the straddled vehicle 1, therefore, the turbocharger 26 is positioned in the space more frontward F and more downward D than the engine body 20. More specifically, exhaust air flows downward D from the cylinder-head exhaust outlet 20bb1 to the turbocharger 26. Therefore, the turbocharger 26 is positioned more downward D than the cylinder-head exhaust outlet 20bb1. The area more downward D than the cylinder-head exhaust outlet 20bb1 is in the space more frontward F and more downward D than the engine body 20. Therefore, the turbocharger 26 is positioned in the space more frontward F and more downward D than the engine body 20, where some members can be easily arranged. In this position, there is extra space around the turbocharger 26, and it becomes possible to shift the engine body 20 and the front wheel 4 closer to each other. As a result, even though the turbocharger 26 is contained in the straddled vehicle 1, the wheelbase can be shortened.

Another reason below why the wheelbase of the straddled vehicle 1, which contains the turbocharger 26, can be shortened will be described below. Specifically, exhaust air flows downward D from the cylinder-head exhaust outlet 20bb1 to the turbocharger 26. When seen in a leftward direction (L), the exhaust air flows clockwise within the turbocharger 26. In the case that these two conditions are satisfied, the exhaust air flows into the turbocharger 26 through the front and upper part of the turbocharger 26. Accordingly, the turbocharger-fixed surface Sd and the cylinder-head-fixed surface Sc are positioned more upward U than the front part of the turbocharger 26. In this case, only a small part of the turbocharger 26 protrudes forward F from the turbocharger-fixed surface Sd and the cylinder-head-fixed surface Sc. Thus, the turbocharger 26 is positioned near the engine body 20. Thereby, the engine body 20 and the front wheel 4 can be positioned closer to each other. As a result, the wheelbase of the straddled vehicle 1, which contains the turbocharger 26, can be shortened.

Additionally, in the straddled vehicle 1, the cylinder head 20b can be cooled efficiently. Specifically, in the cylinder head 20b, the exhaust manifold 20bb may occupy the space that is entirely more frontward f than the front end Pf1 of the cylinder-head-cover-fixed surface Sa. High-temperature exhaust air flows through the exhaust manifold 20bb. Therefore, it is preferred to cool the exhaust manifold 20bb. For this purpose, the engine water jacket EWJ is formed in the exhaust manifold 20bb. Thereby, the cylinder head 20b of the straddled vehicle 1 can be cooled efficiently.

Another reason why the wheelbase of the straddled vehicle 1, which contains the turbocharger 26, can be shortened will be described. Specifically, when viewed from a leftward (L) or rightward (R) position, the front end Pf2 of the turbocharger-fixed surface Sd is entirely positioned more frontward F than the turbocharger rotation axis Ct. Also, when viewed from a leftward (L) or rightward (R) position, the rear end Pb2 of the turbocharger-fixed surface Sd is entirely positioned more backward B than the turbocharger rotation axis Ct. Accordingly, when viewed from an upward (U) or downward (D) position, the turbocharger rotation axis Ct crosses the turbocharger-fixed surface Sd. In other words, the turbocharger rotation axis Ct is near the turbocharger-fixed surface Sd, and the exhaust passage from the turbocharger-fixed surface Sd to the turbocharger rotation axis Ct is short. Due to the short exhaust passage, there is extra space in the area that is more backward B than the front wheel 4 and more frontward F than the engine body 20. Therefore, it is possible to place the engine body 20 and the front wheel 4 closer to each other. As a result, the wheelbase of the straddled vehicle 1, which contains the turbocharger 26, can be shortened.

First Modification

Next, a straddled vehicle 1a according to a first modification will be described with reference to the drawings. FIG. 5 is a right side view of the engine unit 10 of the straddled vehicle 1a.

The straddled vehicle 1a is different from the straddled vehicle 1 in respect of the shape of the exhaust manifold 20bb. More specifically, the exhaust manifold 20bb of the straddled vehicle 1a is shorter than the exhaust manifold 20bb of the straddled vehicle 1. Therefore, the cylinder-head-fixed surface Sc and the turbocharger-fixed surface Sd is parallel to the left cylinder axis CyLl, the center cylinder axis CyLc and the right cylinder axis CyLr. Accordingly, exhaust air flows out forward f from the cylinder-head exhaust outlet 20bb1. There are no other differences between the straddled vehicle 1 and the straddled vehicle 1a, than the structure of the exhaust manifold 20bb. The straddled vehicle 1a will not be described any more.

Second Modification

Next, a straddled vehicle 1b according to a second modification will be described with reference to the drawings. FIG. 6 is a right side view of the engine unit 10 of the straddled vehicle 1b.

The straddled vehicle 1b is different from the straddled vehicle 1 in respect of the position of the turbocharger 26. Specifically, the position of the turbocharger 26 in the straddled vehicle 1b is entirely more upward U than the position of the turbocharger 26 in the straddled vehicle 1.

Accordingly, the turbocharger rotation axis Ct is positioned above (U) the cylinder-head-fixed surface Sc and the turbocharger-fixed surface Sd. Therefore, exhaust air flows upward U from the cylinder-head exhaust outlet 20bb1. When seen in a leftward direction (L), the exhaust air flows counterclockwise within the turbocharger 26.

Third Modification

Next, a straddled vehicle 1c according to a third modification will be described with reference to the drawings. FIG. 7 is a right side view of the engine unit 10 of the straddled vehicle 1c.

The straddled vehicle 1c is different from the straddled vehicle 1 in that the straddled vehicle 1c has a turbocharger water jacket TWJ. Specifically, the turbocharger water jacket TWJ is formed in the turbocharger 26 of the straddled vehicle 1c. The engine water jacket EWJ and the turbocharger water jacket TWJ are connected to each other.

In the straddled vehicle 1c, since the turbocharger water jacket TWJ is connected to the engine water jacket EWJ, the turbocharger 26 is cooled. Therefore, the turbocharger 26 is required to have only a small heat capacity, and the turbocharger 26 can be reduced in size. Accordingly, it is possible to place the engine body 20 and the front wheel 4 closer to each other. As a result, the wheelbase of the straddled vehicle 1c, which contains the turbocharger 26, can be shortened.

In the straddled vehicle 1c, further, since the turbocharger 26 is cooled, the turbocharger 26 may be made of aluminum or an aluminum alloy. This makes it possible to reduce the weight of the turbocharger 26.

Other Embodiments

The embodiments and modifications described herein and/or illustrated by the drawings are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combinations of features of the embodiments and modifications), adaptations and alterations as would be appreciated by those skilled in the art based on the embodiments disclosed herein. The limitations in the claims are to be interpreted broadly based on the language employed in the claims and not to be limited to the embodiments and modifications described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

The straddled vehicle 1 includes one front wheel 4. However, the number of front wheels 4 of the straddled vehicle 1 is not limited to one. The straddled vehicle 1 may include two front wheels 4 or may include three or more front wheels 4.

The straddled vehicle 1 includes one rear wheel 6. However, the number of rear wheels 6 of the straddled vehicle 1 is not limited to one. The straddled vehicle 1 may include two rear wheels 6 or may include three or more rear wheels 6.

Thus, the straddled vehicle 1 may be a three-wheeled or four-wheeled motorcycle. The straddled vehicle 1 may be a motorcar including four or more wheels.

In the engine unit 10, the crankshaft axis Cr intersects with the left cylinder axis CyLl, the center cylinder axis CyLc and the right cylinder axis CyLr. However, the crankshaft axis Cr does not necessarily intersect with the left cylinder axis CyLl, the center cylinder axis CyLc and the right cylinder axis CyLr. In other words, the crankshaft axis Cr may be entirely positioned a little more frontward f or more backward b than the left cylinder axis CyLl, the center cylinder axis CyLc and the right cylinder axis CyLr.

The engine unit 10 has two camshafts. Thus, the engine unit 10 is a DOHC (Double Over Head Camshaft) engine. However, the engine unit 10 is not necessarily a DOHC engine. The engine unit 10 may be, for example, a SOHC (Single Over Head Camshaft) engine or an OHV (Over Head Valve) engine.

The engine unit 10 is a direct-injection engine in which an injector injects fuel into the left combustion chamber 200l, the center combustion chamber 200c and the right combustion chamber 200r. However, the engine unit 10 may be a port-injection engine in which an injector injects fuel into the intake manifold 38. In addition, the injector may be replaced with a carburetor.

In the straddled vehicle 1, the vehicle body frame 2 leans leftward L when the straddled vehicle 1 turns to the left L. The vehicle frame 2 leans rightward R when the straddled vehicle 1 turns to the right R. Thus, the straddled vehicle 1 is a leaning vehicle. However, the vehicle body frame 2 does not necessarily lean when the straddled vehicle 1 turns to the left L or the right R. When the straddled vehicle 1 turns to the left L, the vehicle body frame 2 may lean rightward R by a centrifugal force. When the straddled vehicle 1 turns to the right R, the vehicle body frame 2 may lean leftward L by a centrifugal force. Thus, the straddled vehicle 1 is not necessarily a leaning vehicle. An example of the straddled vehicle 1 that is not a leaning vehicle is ATV (All Terrain Vehicle).

The engine unit 10 is a water-cooling engine. However, the engine unit 10 is not necessarily a water-cooled engine. The engine unit 10 may be an air-cooled engine or an oil-cooled engine.

The engine unit 10 is a gasoline engine. However, the engine unit 10 may use any other kind of fuel than gasoline, for example, such as gas oil, biodiesel, etc.

The engine unit 10 is a parallel three-cylinder engine. However, the engine unit 10 may be a single-cylinder engine or a parallel two-cylinder engine. Alternatively, the engine unit 10 may be a parallel multicylinder engine having four or more cylinders. The engine unit 10 may be a V engine.

The left cylinder axis CyLl, the center cylinder axis CyLc and the right cylinder axis CyLr may be parallel to Up-Down Direction UD. Alternatively, the left cylinder axis CyLl, the center cylinder axis CyLc and the right cylinder axis CyLr may be inclined backward B from Up-Down Direction UD.

A gasket may be inserted between the cylinder-head-fixed surface Sc and the turbocharger-fixed surface Sd. Further, another gasket may be inserted between the cylinder-head-cover-fixed surface Sa and the cylinder-head-fixed surface Sb.

The exhaust manifold 20bb includes one cylinder-head exhaust outlet 20bb1. However, the exhaust manifold 20bb may include a plurality of cylinder-head exhaust outlets 20bb1. The exhaust manifold 20bb is required to have combustion chambers (the left combustion chamber 200l, the center combustion chamber 200c and the right combustion chamber 200r), and at least one cylinder-head exhaust outlet 20bb1, of which the number is smaller than the number of the combustion chambers (the left combustion chamber 200l, the center combustion chamber 200c and the right combustion chamber 200r).

In the straddled vehicles 1a and 1c, the front end Pf2 of the turbocharger-fixed surface Sd may be entirely positioned more backward B than the turbocharger rotation axis Ct when viewed from a leftward (L) or rightward (R) position. In addition, the rear end Pb2 of the turbocharger-fixed surface Sd may be entirely positioned more frontward F than the turbocharger rotation axis Ct when viewed from a leftward (L) or rightward (R) direction.

REFERENCE SIGNS LIST 1, 1a-1c: straddled vehicle
2: vehicle body frame
4: front wheel
6: rear wheel
8: steering mechanism
10: engine unit
12: seat
20: engine body
20a: cylinder head cover
20b: cylinder head
20b1c: center head-body exhaust outlet
20b1l: left head-body exhaust outlet
20b1r: right head-body exhaust outlet
20ba: cylinder head body
20bb: exhaust manifold
20bb1: cylinder-head exhaust outlet
20c: cylinder block
20d: crank case
20e: oil pan
20f: crankshaft
20g: balance shaft
26: turbocharger
126a: turbine wheel
126b: compressor wheel
126c: shaft
200c: center combustion chamber
200l: left combustion chamber
200r: right combustion chamber
202c: center cylinder bore
202l: left cylinder bore
202r: right cylinder bore
226: turbocharger case
226a: turbine housing
226b: compressor housing
226c: center housing
300: stay
Axb: rear axle
Axf: front axle
Cb: balance-shaft axis
Cr: crankshaft axis
Ct: turbocharger rotation axis
CyLc: center cylinder axis
CyLl: left cylinder axis
CyLr: right cylinder axis
EWJ: engine water jacket
Sa: cylinder-head-cover-fixed surface
Sb, Sc: cylinder-head-fixed surface
Sd: turbocharger-fixed surface
Sx: front-axle horizontal plane
Sy: cylinder-head-cover-fixed-surface-front-end horizontal plane
Sz: crankshaft-axis horizontal plane
TWJ: turbocharger water jacket

The invention claimed is:
1. A straddled vehicle comprising:
a vehicle body frame;
an engine unit supported by the vehicle body frame; and
at least one front wheel that is positioned more frontward than the engine unit in a forward-backward direction of the straddled vehicle, and is rotatable around a front axle, wherein
the engine unit includes:
an engine body including a crank case, a cylinder block, a cylinder head, a cylinder head cover, an oil pan, and a crankshaft; and
a turbocharger, including
a turbine wheel that is rotatable around a turbocharger rotation axis by exhaust air flowing out of the engine body, and
a compressor wheel that is rotatable around the turbocharger rotation axis by the rotation of the turbine wheel, and that compresses the intake air, wherein
the crankshaft is rotatable around a crankshaft axis;
the crank case supports the crankshaft;
the cylinder block is fixed to the crank case, and includes a plurality of cylinder bores arranged in alignment in a leftward-rightward direction of the straddled vehicle, each of the cylinder bores having a cylinder axis extending in an upward-downward direction of the straddled vehicle;
the cylinder head is fixed to the cylinder block, and includes:
a plurality of combustion chambers arranged in alignment;
at least one cylinder-head exhaust outlet allowing the exhaust air to flow therethrough out of the cylinder head; and
at least one exhaust passage connecting the plurality of combustion chambers to the at least one cylinder-head exhaust outlet, the plurality of combustion chambers being equal in number to the plurality of cylinder bores, and being larger in number than the at least one cylinder-head exhaust outlet and than the at least one exhaust passage;
the cylinder head cover is fixed to a first surface of the cylinder head;
the turbocharger is positioned more frontward than the engine body and more backward than the at least one front wheel in the forward-backward direction of the straddled vehicle;
the turbocharger at least partially overlaps the engine body in the forward-backward direction of the straddled vehicle;
the turbocharger is fixed to a second surface of the cylinder head so as to receive the exhaust air flowing out through the at least one cylinder-head exhaust outlet, a surface of the turbocharger through which the turbocharger is fixed to the cylinder head being a third surface;
when the vehicle body frame is in an upright state, the turbocharger rotation axis, the second surface and the third surface are positioned
above a first horizontal plane that is a horizontal plane in which the front axle lies,
above a second horizontal plane that is a horizontal plane in which the crankshaft axis lies, and below a third horizontal plane that is a horizontal plane in which a front end of the first surface lies, in the upward-downward direction of the straddled vehicle;

a first distance, which is a distance between a front end of the second surface and the cylinder axis, is longer than a second distance, which is a distance between the front end of the first surface and the cylinder axis;

the second surface is positioned more upward than the first horizontal plane and the second horizontal plane, and more downward than the third horizontal plane, in the upward-downward direction of the straddled vehicle; and the turbocharger rotation axis is below the second surface and the third surface, in the upward-downward direction of the straddled vehicle, wherein the engine unit further includes an intercooler and a radiator, the radiator is positioned more backward than the at least one front wheel, and more frontward than the crank case and the oil pan, the turbocharger is positioned more upward than the radiator, the intercooler is positioned more backward than the at least one front wheel, and more frontward than the engine body, the intercooler is positioned more upward than the radiator and the turbocharger, and the radiator includes a radiator core, which is curved in such a manner that a center portion of the radiator core, with respect to the leftward-rightward direction of the straddled vehicle, bulges backward from a left end and a right end of the radiator core so as to prevent the radiator core from coming into contact with the at least one front wheel.

2. The straddled vehicle according to claim 1, wherein:
the cylinder axis is inclined forward with respect to the upward-downward direction of the straddled vehicle; and
the exhaust air flows downward from the at least one cylinder-head exhaust outlet.

3. The straddled vehicle according to claim 1, wherein:
the cylinder axis is inclined forward with respect to the upward-downward direction of the straddled vehicle; and
the second surface and the third surface are parallel to the cylinder axis.

4. The straddled vehicle according to claim 1, wherein the turbocharger rotation axis is below the first surface in the upward-downward direction of the straddled vehicle.

5. The straddled vehicle according to claim 2, wherein:
the turbocharger rotation axis extends in the leftward-rightward direction of the straddled vehicle; and
the exhaust air flows clockwise within the turbocharger in a left side view of the straddled vehicle.

6. A straddled vehicle comprising:
a vehicle body frame;
an engine unit supported by the vehicle body frame; and
at least one front wheel that is positioned more frontward than the engine unit in a forward-backward direction of the straddled vehicle, and is rotatable around a front axle, wherein
the engine unit includes:
an engine body including a crank case, a cylinder block, a cylinder head, a cylinder head cover, and a crankshaft; and a turbocharger, including
a turbine wheel that is rotatable around a turbocharger rotation axis by exhaust air flowing out of the engine body, and
a compressor wheel that is rotatable around the turbocharger rotation axis by the rotation of the turbine wheel, and that compresses the intake air,
wherein
the crankshaft is rotatable around a crankshaft axis;
the crank case supports the crankshaft;
the cylinder block is fixed to the crank case, and includes a plurality of cylinder bores arranged in alignment in a leftward-rightward direction of the straddled vehicle, each of the cylinder bores having a cylinder axis extending in an upward-downward direction of the straddled vehicle;
the cylinder head is fixed to the cylinder block, and includes:
a plurality of combustion chambers arranged in alignment;
at least one cylinder-head exhaust outlet allowing the exhaust air to flow therethrough out of the cylinder head; and
at least one exhaust passage connecting the plurality of combustion chambers to the at least one cylinder-head exhaust outlet,
the plurality of combustion chambers being equal in number to the plurality of cylinder bores, and being larger in number than the at least one cylinder-head exhaust outlet and than the at least one exhaust passage;
the cylinder head cover is fixed to a first surface of the cylinder head;
the turbocharger is positioned more frontward than the engine body and more backward than the at least one front wheel in the forward-backward direction of the straddled vehicle;
the turbocharger at least partially overlaps the engine body in the forward-backward direction of the straddled vehicle;
the turbocharger is fixed to a second surface of the cylinder head so as to receive the exhaust air flowing out through the at least one cylinder-head exhaust outlet, a surface of the turbocharger through which the turbocharger is fixed to the cylinder head being a third surface;
when the vehicle body frame is in an upright state, the turbocharger rotation axis, the second surface and the third surface are positioned
above a first horizontal plane that is a horizontal plane in which the front axle lies,
above a second horizontal plane that is a horizontal plane in which the crankshaft axis lies, and
below a third horizontal plane that is a horizontal plane in which a front end of the first surface lies,
in the upward-downward direction of the straddled vehicle;
a first distance, which is a distance between a front end of the second surface and the cylinder axis, is longer than a second distance, which is a distance between the front end of the first surface and the cylinder axis;
the second surface is positioned more upward than the first horizontal plane and the second horizontal plane, and more downward than the third horizontal plane, in the upward-downward direction of the straddled vehicle; and
the turbocharger rotation axis is below the second surface and the third surface, in the upward-downward direction of the straddled vehicle, wherein the engine unit further includes an engine water jacket that is formed in the cylinder head, and is entirely positioned more frontward in a cylinder-axis-forward-backward direction than the front end of the first surface, the cylinder-axis-forward-backward direction being a direction perpendicular to the cylinder axis in a side view of the straddled vehicle, the engine water jacket being a passage in which a cooling water that cools the engine body flows.

7. The straddled vehicle according to claim 1, wherein, in the forward-backward direction of the straddled vehicle,
the entire front end of the second surface is positioned more frontward than the turbocharger rotation axis, and
an entire rear end of the second surface is positioned more backward than the turbocharger rotation axis.

8. The straddled vehicle according to claim 6, further comprising:
a turbocharger water jacket formed in the turbocharger, wherein
the engine water jacket and the turbocharger water jacket are connected to each other.

* * * * *